US011757636B2

(12) United States Patent
Elmenshawy et al.

(10) Patent No.: US 11,757,636 B2
(45) Date of Patent: Sep. 12, 2023

(54) ACCESS CONTROL FOR SHORT-LIVED RESOURCE PRINCIPALS

(71) Applicant: Oracle International Corporation, Redwood Shores, CA (US)

(72) Inventors: Ayman Mohammed Aly Hassan Elmenshawy, Bellevue, WA (US); Girish Nagaraja, Sammamish, WA (US); Daniel M. Vogel, Seattle, CA (US)

(73) Assignee: Oracle International Corporation, Redwood Shores, CA (US)

( * ) Notice: Subject to any disclaimer, the term of this patent is extended or adjusted under 35 U.S.C. 154(b) by 351 days.

(21) Appl. No.: 17/198,021

(22) Filed: Mar. 10, 2021

(65) Prior Publication Data

US 2021/0409218 A1 Dec. 30, 2021

Related U.S. Application Data

(60) Provisional application No. 63/044,286, filed on Jun. 25, 2020.

(51) Int. Cl.
*H04L 9/32* (2006.01)
*H04L 9/40* (2022.01)
*H04L 47/70* (2022.01)

(52) U.S. Cl.
CPC ............ *H04L 9/3213* (2013.01); *H04L 47/82* (2013.01); *H04L 63/10* (2013.01)

(58) Field of Classification Search
CPC ....... H04L 9/3213; H04L 47/82; H04L 63/10; H04L 9/16; H04L 63/0807; H04L 63/108; H04L 63/126; H04L 9/088
See application file for complete search history.

(56) References Cited

U.S. PATENT DOCUMENTS

| 8,990,374 | B2 | 3/2015 | Otani |
| 11,044,257 | B1 * | 6/2021 | Heuts .................... H04L 63/108 |
| 11,134,098 | B1 * | 9/2021 | Lieberman .......... H04L 63/1425 |
| 11,418,343 | B2 | 8/2022 | Elmenshawy et al. |

(Continued)

OTHER PUBLICATIONS

U.S. Appl. No. 17/198,019, "Non-Final Office Action", dated Aug. 18, 2022, 6 pages.

(Continued)

*Primary Examiner* — Michael R Vaughan
(74) *Attorney, Agent, or Firm* — Kilpatrick Townsend & Stockton LLP

(57) ABSTRACT

Techniques are described for enabling resources within a cloud computing system to interact with each other. In certain embodiments, a resource is assigned a digital token that provides certain access privileges for the duration in which the digital token is valid. The digital token permits the resource to have access for a duration sufficient to perform some operation (e.g., run one-time code or the same code periodically on a scheduled basis), but without extending the level of access for significantly longer than necessary to complete the operation. Each time the resource principal is to perform the operation, the token can be reissued to the resource to provide the resource with time-limited access privileges. The use of this short-lived token avoids having to create permanent credentials for the resource.

20 Claims, 15 Drawing Sheets

(56) References Cited

U.S. PATENT DOCUMENTS

| | | | |
|---|---|---|---|
| 2014/0059642 A1 | 2/2014 | Deasy et al. | |
| 2015/0180872 A1 | 6/2015 | Christner | |
| 2015/0341334 A1 | 11/2015 | Bhimanaik | |
| 2018/0241734 A1 | 8/2018 | Bhimanaik | |
| 2018/0247064 A1* | 8/2018 | Aronovich | G06F 16/24552 |
| 2018/0316676 A1 | 11/2018 | Gilpin et al. | |
| 2019/0199687 A1* | 6/2019 | Lan | G06F 21/53 |
| 2019/0268167 A1 | 8/2019 | White et al. | |
| 2019/0364035 A1 | 11/2019 | Smolny | |
| 2019/0387025 A1 | 12/2019 | Gummaraju et al. | |
| 2020/0358757 A1 | 11/2020 | Kulkarni | |
| 2021/0208941 A1* | 7/2021 | Fong | G06F 9/45558 |
| 2021/0377044 A1 | 12/2021 | Leibmann et al. | |
| 2021/0392111 A1 | 12/2021 | Sole et al. | |
| 2021/0409218 A1 | 12/2021 | Elmenshawy et al. | |
| 2021/0409219 A1 | 12/2021 | Elmenshawy et al. | |
| 2021/0409345 A1 | 12/2021 | Elmenshawy et al. | |
| 2022/0078179 A1 | 3/2022 | Hoggan et al. | |
| 2022/0255916 A1* | 8/2022 | Smith | G06F 21/44 |

OTHER PUBLICATIONS

U.S. Appl. No. 17/198,024, "Notice of Allowance", dated May 17, 2022, 10 pages.

YouTube Video, Identities for Everything—Jun. 27 | Identiverse 2019, https://youtube/_oZYLKG3X_k, 14:07 minutes of video, snap pictures of beginning of video, 6 pages.

Calling Services from an Instance, Oracle Cloud Infrastructure Instance Principals, retrieved Mar. 10, 2021, https://docs.oracle.com/enus/iaas/Content/Identity/Tasks/callingservicesfrominstances.htm, 6 pages.

Managing Dynamic Groups, Oracle Cloud Infrastructure Documentation, retrieved Mar. 10, 2021, https://docs.oracle.com/en-us/iaas/Content/Identity/Tasks/managingdynanicgroups.hmn, 6 pages.

Key Concepts and Terminology, Oracle Cloud Infrastructure Documentation, retrieved Mar. 10, 2021, https://docs.oracle.com/en-us/iaas/Content/GSG/Concepts/concepts.htm, 6 pages.

Cavage, M. and Sporney, M. IETF Internet Draft: Signing HTTP Messages:, Digital Bazaar, May 14, 2018, https://tools.ietf.org/html/draft-cavage-http-signatures-10, 19 pages.

* cited by examiner

1000

Generate a digital token for a first resource within a logical container, where the digital token has a validity period and permits the first resource to access a second resource in the logical container while the digital token remains valid;
1002

Store an association between the digital token and a first credential belonging to the first resource such that, due to the stored association, access to the second resource based upon the digital token is conditioned upon successful authentication of the first resource using the first credential
1004

Receive a request to renew the digital token, the request including a second credential different from the first credential
1006

Determine, using the first credential, that the request is from the first resource
1008

Responsive to the determination in 1008, renew the digital token by updating the stored association to replace the first credential with the second credential such that, for a subsequent request to access the second resource based upon the digital token, access is conditioned upon successful authentication of the first resource using the second credential
1010

*FIG. 10*

ACCESS CONTROL FOR SHORT-LIVED RESOURCE PRINCIPALS

CROSS-REFERENCE TO RELATED APPLICATIONS

The present application claims the benefit and priority under 35 U.S.C. 119(e) of U.S. Application No. 63/044,286, filed on Jun. 25, 2020, entitled "ACCESS CONTROL FOR SHORT-LIVED RESOURCE PRINCIPALS," the content of which is herein incorporated by reference in its entirety for all purposes.

BACKGROUND

Cloud-based computing platforms offer significant advantages over traditional on-premises computing platforms. For instance, cloud-based computing platforms provide scalable and flexible computing resources for users and can be deployed across geographic regions that are widely spaced apart (e.g., in different countries). Cloud-based computing platforms can provide one or more categories of services, including Software as a Service (SaaS), Platform as a Service (PaaS), or Infrastructure as a Service (IaaS). Under an IaaS cloud service model, one or types of resources are hosted by a cloud service provider and made available to a client (e.g., an enterprise customer). Such resources can include computing resources (e.g., compute instances), networking resources (e.g., a virtual private network), storage resources (e.g., cloud-based databases), and other hardware or software resources. Resources may be provisioned for use in a tenancy associated with a particular client. Within the tenancy, the client may have secure and isolated access to the provisioned resources, and the cloud platform may provide the client with software tools for organizing, administering, or otherwise managing the provisioned resources. For instance, an enterprise client may be provided with tools for defining the scope of access privileges to resources by different groups of employees of the enterprise client.

In a distributed computing environment such as an environment that includes a computing platform operating under an IaaS cloud service model, various entities may request access permission to protected resources. The level of access can vary among entities. For instance, as indicated above, different users within a tenancy may have access privileges that depend on their user role (e.g., human resources, administrators, sales, etc.). Thus, access control can be based upon user identity. In addition to human users, entities that require access to resources may include compute instances (e.g., virtual or bare metal machines). Compute instances can be provisioned and managed through the cloud infrastructure, such as Oracle Cloud Infrastructure (OCI). Compute instances can be launched to meet computing and/or application needs. After an instance is launched, it can be accessed, restarted, and/or terminated. Any changes made to the instance can be removed when the instance is terminated. Further, any changes can be retained. More generally, a resource within a particular tenancy or logical container may at times request access to another resource within the tenancy/logical container, where the other resource is protected. Like human users, instances can have identities assigned to them. Within an identity and access management (IAM) service provided as part of a cloud platform, such entities are sometimes referred to as "principals." A principal is an entity that can be permitted, based on the identity of the principal, to interact with other resources in a cloud computing environment (e.g., to perform a read, a write, or a service-related operation).

Security within a cloud computing environment can be managed based on actions performed by the cloud service provider as well as actions performed by the client (e.g., tenant). For example, in a shared, multi-tenant computing environment, the cloud service provider may be responsible for the security of the underlying cloud infrastructure (such as data-center facilities, and hardware and software systems) and tenants may be responsible for securing their workloads and securely configuring their services (such as compute, network, storage, and database, etc.).

Resources in a cloud computing environment may be organized into different logical containers. A client tenancy is an example of a logical container that operates as a secure and isolated partition in which the client can administer and manage cloud resources that have been provided by a cloud service provider using one or more cloud services (e.g., data storage, compute, or network services). The underlying infrastructure resources upon which the resources of a client tenancy are built are typically not visible to the client, and the client has no access control over such infrastructure resources. Because resources can exist at different levels or security domains of the cloud computing environment (e.g., within different logical containers and/or sub-containers that are accessed-managed by different entities) and are often built on top of each other, interaction between resources is often not possible.

BRIEF SUMMARY

The present disclosure relates to cloud computing systems, and more particularly, to techniques for enabling resources within a cloud computing system to interact with each other. Various embodiments are described herein, including methods, systems, non-transitory computer-readable storage media storing programs, code, or instructions executable by one or more processors, and the like.

In certain embodiments, a resource principal is assigned a digital token that provides certain access privileges for the duration in which the digital token is valid (e.g., thirty seconds). The digital token permits the resource principal to have access for a duration sufficient to perform some operation (e.g., run one-time code or the same code periodically on a scheduled basis), but without extending the level of access for significantly longer than necessary to complete the operation. For example, the resource principal may be a software function or code running on a compute instance, where the function/code exists within a function tenancy, and the function/code may be configured to periodically access another resource in a client tenancy as part of its operation. Each time the resource principal is to perform the operation (e.g., whenever the function is invoked), the token can be reissued to the resource principal to provide the resource principal with time-limited access privileges. The use of this short-lived token avoids having to create permanent credentials for the resource principal. For example, in the absence of a short-lived token, a dummy username and a corresponding password may be created in order to permit the resource principal to perform the operation based on privileges associated with the dummy username, and the dummy username/password may be rotated periodically according to a security policy. From the client's perspective, the actions performed by the resource principal appear to be actions of the dummy user instead of actions performed by the client's database or other client resource.

In certain embodiments, a base identifier assigned to a resource principal is extended by mapping the base identifier onto a second identifier (referred to herein as a stacked identifier). For example, the base identifier may be an infrastructure level identifier for the resource principal. The stacked identifier may be an identifier that identifies a logical resource, upon which the resource principal is built, as being a resource belonging to a particular customer tenancy (e.g., as being the customer's database). This allows the resource principal to have two identities, one identity indicating what the resource principal is (e.g., a particular compute instance) and another identity indicating the purpose of the resource principal (e.g., operating as a database for a particular customer tenancy). Further, the stacked identifier can enable the resource principal to act in a particular capacity beyond that indicated by its base identifier (a different usage domain). For instance, a stacked identifier may enable a compute instance to interact with other resources in a client tenancy by presenting itself not as a generic compute instance, but as a logical resource associated with the client tenancy (e.g., a database belonging to the client). In this manner, the resource principal may be provided with access privileges different from those associated with the base identifier (e.g., access privileges not available using the base identifier). Additionally, allowing a resource principal to communicate under the guise of a stacked identifier reduces the number of credentials that need to be created and managed. In the absence of stacked identifiers, resources may resort to directly authenticating with each other in order to communicate (e.g., authentication based on a credential specific to a relationship between two resources).

Reducing the number of credentials makes the system less complex to implement since there are fewer relationships to manage and fewer authentication mechanisms to apply. Further, stacked identifiers help to prevent unintended privilege escalations such as the "confused deputy" problem by avoiding granting too much authority to resources. In the confused deputy problem, a computer program (or more generally, a computing resource) is fooled by another party into misusing the computer program's authority due to a separation between authority (what the computer program is authorized to do) and intent (what the computer program is supposed to do). For example, if a compute instance providing a client database were issued a credential in its capacity as a compute instance within a database tenancy, the credential could be used to gain access to data outside of the client database because the credential may provide a higher level of privilege than needed for accessing the client database. However, if the compute instance were issued a credential in its capacity as a database associated with a client tenancy, the client would then be able to specify the level of privilege for the database and, by extension, the level of privilege for the compute instance acting as the database.

In certain embodiments, a token renewal mechanism is provided for extending the duration in which a resource principal can access another resource. The token renewal mechanism can be used to provide prolonged access by a resource principal that is relatively long-lived, by allowing the resource principal to periodically re-attest to itself. The token renewal mechanism is particularly useful for managing access by resource principals that are not directly controlled by the cloud service provider. In some embodiments, the token renewal mechanism involves a resource principal periodically causing a new credential (e.g., a new public-private key pair) to be generated for itself and then communicating the new credential (e.g., the public key portion of the new public-private key pair) to an identity and access management (IAM) system in the cloud infrastructure. The new credential may be generated for the purpose of compliance with a credential rotation policy specifying that credentials should be changed after a certain period of time. The new credential may be communicated in a request signed using an existing credential (e.g., an old private key). The IAM system may associate a digital token (which is time-limited) with the new credential so that for subsequent requests, the IAM system will only recognize the resource principal based upon the new credential. In this manner, the ability of the resource principal to assert its identity can be time-limited, but this ability can be renewed as often as an entity controlling the resource principal wishes. Additionally, the time window within which the credential and/or the digital token could potentially be compromised (e.g., stolen) is limited as a result of the periodic credential rotation.

In certain embodiments, a method performable by one or more processors of a computer system involves providing, by the computer system, a first resource through a cloud service for use within a logical container associated with a client of the computer system; and determining, by the computer system, that the first resource will be configured to operate for a limited duration in the logical container. The method further involves based upon determining that the first resource will be configured to operate for a limited duration in the logical container, generating, by the computer system, a digital token for the first resource. The digital token has a validity period and permits the first resource to access a second resource in the logical container while the digital token remains valid.

BRIEF DESCRIPTION OF THE DRAWINGS

FIG. 10 is a simplified flowchart depicting a process for limiting the duration of access for a resource, according to certain embodiments.

DETAILED DESCRIPTION

Figure 1:
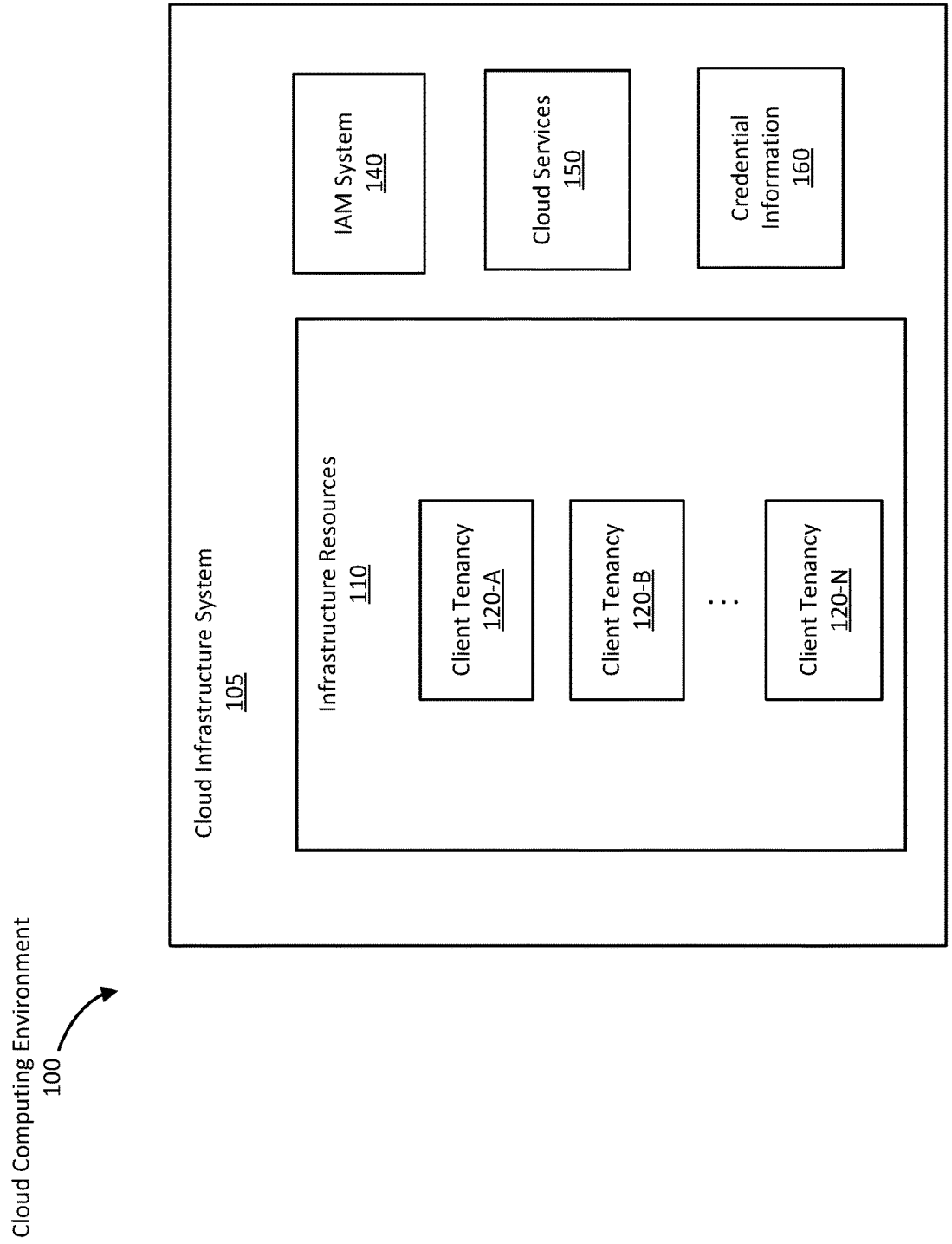
FIG. 1 is a simplified block diagram of an example cloud computing environment in accordance with one or more embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The present disclosure relates to cloud computing systems, and more particularly, to techniques for enabling resources within a cloud computing system to interact with each other. In a distributed computing environment such as an environment that includes a computing platform operating under an IaaS cloud service model, various entities may request access permission to protected resources. The level of access can vary among entities. For instance, as indicated above, different users within a tenancy may have access privileges that depend on their user role (e.g., human resources, administrators, sales, etc.). Thus, access control can be based upon user identity. In addition to human users, entities that request access to resources may include compute instances (e.g., virtual or bare metal machines). More generally, a resource within a particular client tenancy or logical container may at times request access to another resource within the tenancy/logical container, where the other resource is protected. Like human users, instances can have identities assigned to them. Within an identity and access management (IAM) service provided as part of a cloud platform, such entities are sometimes referred to as "principals." A principal is an entity that can be permitted, based on the identity of the principal, to interact with (e.g., access) resources in a cloud computing environment (e.g., to perform a read, a write, or a service-related operation). Thus, a principal can be a user principal or a resource principal (e.g., an instance principal).

Security within a cloud computing environment can be managed based on actions performed by the cloud service provider as well as actions performed by the client (e.g., tenant). For example, in a shared, multi-tenant computing environment, the cloud service provider may be responsible for the security of the underlying cloud infrastructure (such as data-center facilities, and hardware and software systems) and tenants may be responsible for securing their workloads and securely configuring their services (such as compute, network, storage, and database, etc.).

Resources in a cloud computing environment may be organized into different logical containers. A client tenancy is an example of a logical container that functions as a secure and isolated partition in which the client can administer and manage cloud resources that have been provided by a cloud service provider using one or more cloud services (e.g., data storage, compute, or network services). The underlying infrastructure resources upon which the resources of a client tenancy are built are typically not visible to the client, and the client has no access control over such infrastructure resources.

Because resources can exist at different levels or security domains of the cloud computing environment (e.g., within different logical containers and/or sub-containers that are accessed-managed by different entities) and are often built on top of each other, interaction between resources is often not possible. For example, if a client requests a database to be provisioned for their tenancy, the cloud service provider may, as part of providing a database service, allocate a compute instance to a database tenancy and then run software on the compute instance to associate the compute instance with the client's network. Since the compute instance is identified as being a compute instance within the database tenancy and not the client's tenancy, the client cannot apply access control to the compute instance acting as a database (e.g., to define access privileges of individual users to the contents of the database based on a client specified access policy).

FIG. 1 is a simplified block diagram of an example cloud computing environment 100 in accordance with one or more embodiments. The environment 100 includes a cloud infrastructure system 105 operated by a cloud service provider. The cloud infrastructure system 105 may include infrastructure resources 110 (e.g., hardware and/or software components configurable to provide cloud services 150 to clients of the cloud infrastructure system 105. As illustrated, the infrastructure resources can be partitioned into different client tenancies 120A-120-N. Each client tenancy 120 is a logical container that can contain logical resources to which the corresponding client has secure and private access. For example a logical resource could be a database, a load balancer, or a testing platform for testing software code.

The logical resources within a client tenancy 120 can be built from infrastructure resources provided to the client through one or more of the cloud services 150. For example, cloud infrastructure system 105 may be configured to provide a database to the client tenancy 120-A using one or more compute instances (e.g., bare metal servers or virtual machines). To instantiate the database, the client associated with the client tenancy 120-A may communicate, using a client device (not depicted), a provisioning request specifying details of how the database is to be configured (e.g., a certain number of compute instances to allocate to the database, performance requirements, and the like). Although the database may be managed by the client, the client generally has no knowledge of how the database is actually implemented (e.g., knowledge of which particular compute instances among a set of compute instances within the cloud infrastructure system 105 are used to provide the database). The infrastructure resources upon which the logical resources are built may belong to one or more logical containers that are separately managed. For example, a compute instance may belong to a function tenancy managed by the cloud service provider as part of providing a function (code execution) service under a Functions as a Service (Faas) model such as that available through Oracle Cloud Infrastructure (OCI).

In an FaaS model, a cloud service provider provides a platform for clients to develop, execute, and manage application functionalities without needing to be concerned about the supporting infrastructure because the infrastructure is supplied by the cloud service provider and thus "serverless"

from the client's perspective. An application may include multiple functions. Each function can be a block of code configured to perform a limited set of operations (e.g., a single task). In some embodiments, functions are stored as software images (e.g., images compatible with the Docker Engine software available from Docker, Inc. of San Francisco, Calif.). Each software image may include software code, libraries, system tools, configuration settings, and/or other information that enables the software image to be converted into executable code at runtime. For example, in some embodiments, a software image may be converted into executable code running within its own container that isolates the software from its execution environment. The container can be removed (e.g., deleted from a memory of a compute instance) upon termination of execution or after an idle period of a certain duration.

In FaaS, software code (e.g., a function forming part of a software application) can be executed based on client specified conditions or triggers, such as according to a schedule or in response to events occurring on a system or device in the client's tenancy. For example, a compute instance providing a function service can be configured to execute a function each time a write occurs to a particular bucket in a client's cloud database. Functions can also be manually invoked by a client. Upon execution, the function may access the cloud database or another resource (e.g. the client's backup object storage). Although the client may be able to specify an access policy with respect to the contents of the database (e.g., by defining a user group and creating a rule that assigns certain access privileges to a bucket within the database to the user group), such an access policy would not apply to the compute instance since the compute instance resides in a different tenancy/logical container to which the client has no access.

As another example of a service that may be included as part of the cloud services 150, the infrastructure resources 110 may include compute instances that host a virtual cloud network (VCN) accessible to users associated with the client tenancy 120-A. Thus, the infrastructure resources 110 may be configured to provide a network service with functionality such as load balancing, switching, routing, and the like. As with the database example above, the client associated with client tenancy 120-A may not have visibility into how the networking services are implemented.

Additionally, in some cases, a client tenancy may include resources not built upon infrastructure resources supplied by a cloud service provider. For example, the client associated with the client tenancy 120-B may choose to supply their own database (e.g., using on-premises servers) while taking advantage of other types of cloud services 150 (e.g., a cloud based object storage service for backing up the data in the database).

As illustrated in FIG. 1, the cloud infrastructure system 105 may include an Identity Access Management (IAM) system 140. The IAM system 140 may be configured to manage access to the infrastructure resources 110 by user principals and/or resource principals. For example, the functionality provided by the IAM system 140 may include a cloud based identity service (another example of cloud services 150). The cloud based identity service can be configured to maintain stored information about users associated with the tenancies 120A-120N, such as usernames, passwords or other credential information 160, user information, and the like. IAM system 140 can be implemented in hardware and/or software and may include, for example, one or more access management servers configured to process requests from client devices for access to resources within the client tenancies 120A-120N.

As indicated above, principals can include user principals and resource principals. Thus, the IAM system 140 may be configured to store, as part of the credential information 160, credentials for both user principals and resource principals. Such credentials can be used to determine whether to grant or deny an access request from a principal. In particular, IAM system 140 may provide authentication and/or authorization services, whereby the identity of a principal is verified (authenticated) based upon the principal being able to present a valid credential, and whereby an authenticated principal is granted permission (authorized) to access a resource based upon an applicable access policy. For example, a resource principal requesting access to another resource may submit an access request that is signed using a digital certificate or private key associated with the resource principal.

In certain embodiments, the IAM system 140 may operate as a central access manager that manages credentials for infrastructure resources and resources built using infrastructure resources. In other embodiments, access management responsibilities may be distributed between the IAM system 140 and one or more additional components. Such additional components may be part of the cloud infrastructure system 105 and/or part of a remote computer system in communication with the IAM system 140. For example, in certain embodiments, a third-party certificate authority may be configured to issue digital certificates to resource principals, where the digital certificates are presentable to the IAM system 140 for verifying the identity of the resource principals to which the digital certificates are issued.

However, even when the IAM system 140 is configured to operate as a central access manager, permission to access resources within the cloud infrastructure system 105 may still be subject to limitations on the ability of the entity (e.g., a particular client/tenant) administering a resource principal to set access privileges. In situations where a resource principal is a logical resource built using an infrastructure resource (e.g., a database implemented using one or more compute instances allocated by the cloud service provider), the administering entity may be provided with the ability to set and manage access privileges for accessing logical resources belonging to the administering entity, but only with respect to accesses performed by resource principals that are under the administering entity's control. The administering entity may have no ability to control access by or to underlying infrastructure resources. Thus, even an access by a first logical resource to a second logical resource belonging to the same entity may not be possible absent a mechanism for establishing trust between resources. Embodiments are described below which provide such a mechanism based upon various techniques for establishing an identity for a resource principal.

Figure 2:
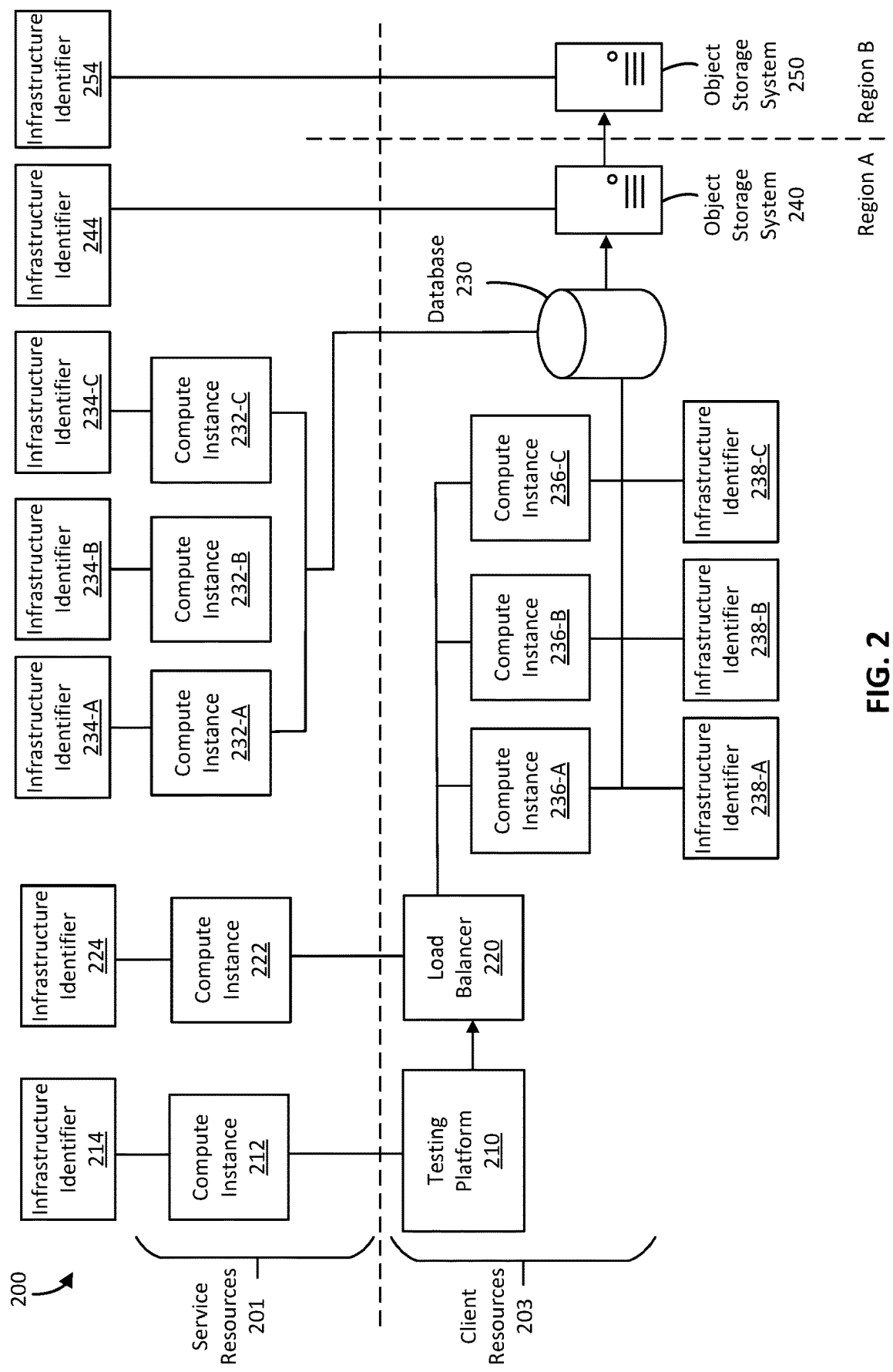
FIG. 2 illustrates an example of a cloud service architecture corresponding to a single tenancy, in accordance with one or more embodiments

FIG. 2 illustrates an example of a cloud service architecture 200 corresponding to a single tenancy, in accordance with one or more embodiments. The cloud service architecture 200 includes service resources 201 and client resources 203. An example service resource can include a Function as a Service instance. Service resources can include infrastructure resources that is used by a service to compose a client resource. As illustrated, the service resources 201 include compute instances 212, 222, and 232-A to 232-C, and the client resources 203 include a testing platform 210, a load balancer 220, a database 230, compute instances 236-A to 236-C, and object storage systems 240 and 250. A compute instance can include a virtual machine (VM) host with an operating system (OS). The service resources 201 include infrastructure resources provided by a cloud service provider for building corresponding client resources 203. Infrastructure resources can include a compute instance, storage bucket, database instance and functions. For example, compute instance 212 may correspond to a testing platform 210 configured for testing software code, the compute instance 222 may correspond to a load balancer 220 configured to distribute network traffic within a client's private network, and compute instances 232-A to 232-C may correspond to a database 230.

The testing platform 210, the load balancer 220, and the database 230 are logical resources that can each be considered a separate container within the logical container representing the overall tenancy. The object storage systems 240, 250 are also separate containers that provide data storage services. Each resource allocated by the cloud service provider to the tenancy can be assigned its own infrastructure identifier (e.g., a digital certificate that uniquely identifies the resource). The infrastructure identifier can be assigned by the parent service exposing the resource to the end user and can be persisted in service-specific stores. This includes each of the service resources 201 and the object storage systems 240, 250. Object storage 240 can correspond to storage for a region A and object storage 250 can correspond to storage for a region B. Region A can correspond to a first geographic region and region B can correspond to a second geographic region that is different from region A. As shown in FIG. 2, compute instance 212 may be assigned infrastructure identifier 214, compute instance 222 assigned infrastructure identifier 224, compute instances 232-A to 232-C assigned infrastructure identifiers 234-A to 234-C, object storage system 240 assigned infrastructure identifier 244, and object storage system 250 assigned infrastructure identifier 254. The infrastructure identifiers may be assigned by the cloud service provider (e.g., by an IAM system such as the IAM system 140 in the embodiment of FIG. 1) and may indicate what each corresponding resource is. For example, infrastructure identifier 234-A may uniquely identify compute instance 232-A as being a particular compute instance (e.g., a virtual machine or bare metal instance) from among a set of compute instances belonging to the cloud service provider. Thus, the compute instances 212, 222, and 232-A to 232-C may be considered to be resource principals of the cloud service provider. In certain embodiments, infrastructure identifiers are issued as digital certificates by the cloud service provider (e.g., using IAM system 140). The infrastructure identifiers and the service resources 201 are generally not visible to users associated with the tenancy since they are not controlled by the user.

As shown in FIG. 2, the compute instances 236-A to 236-C may also be assigned infrastructure identifiers 238-A to 238-C by the cloud service provider. However, unlike the compute instances 232-A to 232-C, the compute instances 236-A to 236-C may be directly controlled or managed by a user associated with the tenancy. Accordingly, the infrastructure identifiers 238-A to 238-C may be visible to the user. The infrastructure identifiers can be visible to a user since services can expose API's thereby allowing a user with sufficient access to list resources and their identifiers in a tenancy. Each resource depicted in FIG. 2 may use the identity provided by its corresponding infrastructure identifier to authenticate and gain authorization to access another resource.

The infrastructure identifiers reduce the number of credentials and special relationships to be maintained for the resources. For example, in the absence of infrastructure identifiers, a Secure Sockets Layer (SSL) or Transport Layer Security (TLS) certificate may be deployed in the load balancer 220 to enable the load balancer 220 to direct requests from the testing platform 210 to the compute instances 236-A to 236-C. Further, communications between the load balancer 220 and a compute instance 236 may involve Mutual TLS authentication (mTLS). Likewise, communications between a compute instance 236 and the database 230 may involve mTLS or creation of a database credential (e.g., a dummy username and password) for authenticating the compute instance 236 with the database 230. Further, communications between the database 230 and the object storage system 240 may involve cross-service authentication between a database service and an object storage service. Communications between object storage system 240 (e.g., a primary backup system for replicating data stored in the database 230) and object storage system 250 (e.g., a disaster recovery system) may involve use of a cross-region credential, for example, because object storage system 240 is located in a different geographic region (region A) than the object storage system 250 (region B).

Figure 3:
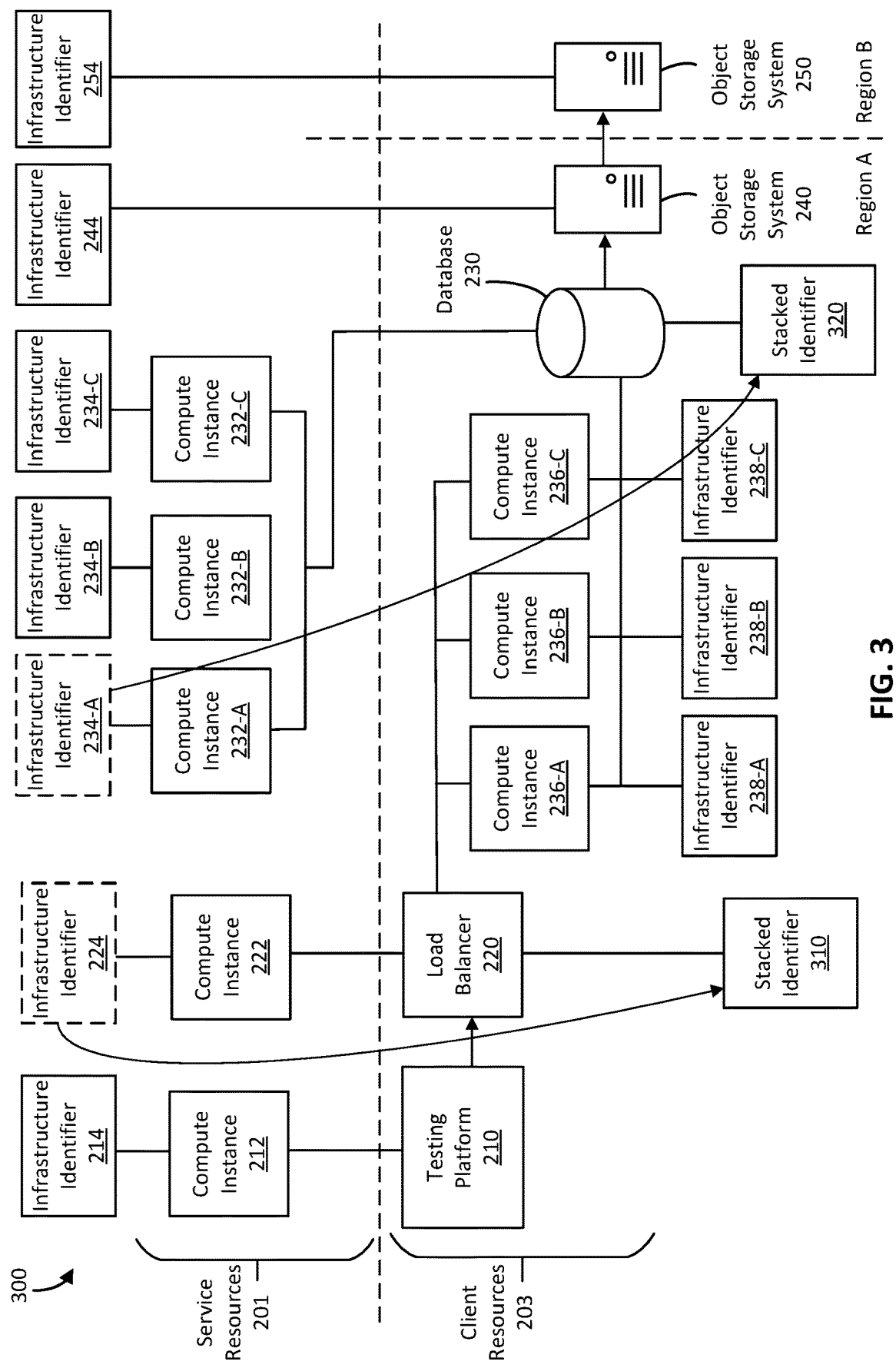
FIG. 3 illustrates an example of a cloud service architecture with stacked identifiers, in accordance with one or more embodiments.

FIG. 3 illustrates an example of a cloud service architecture 300 with stacked identifiers, in accordance with one or more embodiments. The cloud service architecture 300 expands upon the example illustrated in FIG. 2 and includes a stacked identifier 310 generated for the load balancer 220 and a stacked identifier 320 generated for the database 230. A stacked identifier is generated for load balancer 220 and a stacked identifier 320 for purposes of example. Stacked identifiers can be created for each of the elements in client resources 203. Each stacked identifier 310, 320 is generated by projecting a corresponding infrastructure identifier onto an additional identifier (i.e., the stacked identifier) that identifies a resource as belonging to the client tenancy. The identity associated with the infrastructure identifier is mapped to the identity associated with the stacked identifier. For example, stacked identifier 310 may identify load balancer 220 as being a load balancer belonging to the client tenancy. Further, the load balancer 220 may use the stacked identifier 310 to issue a signed request for a digital certificate used to authenticate with another resource (e.g., mTLS authentication with compute instance 236-A). In certain embodiments, a stacked identifier is generated as a digital token (e.g., a JSON web token (JWT)). The digital token can include an identifier associated with a logical resource upon which the underlying resource is built (e.g., a identifier of the database 230 or the load balancer 220), an identifier associated with a logical container to which the logical resource belongs (e.g., an identifier of a particular client tenancy), and information indicating a resource type of the logical resource (e.g., database, load balancer, etc.).

As an analogy, if the infrastructure identifier 224 is like a birth certificate, then the stacked identifier 310 is like a passport obtained using the birth certificate. The birth certificate enables the passport to be obtained, but the purposes of the birth certificate and the passport, and the privileges associated with these two forms of identification, are different. In this manner, the identity of a resource (e.g., the load balancer 220) is tied to the purpose of the resource (e.g., operating as a load balancer of the tenant), with the purpose being specified by the service controlling the resource (e.g., a network service) and not the underlying infrastructure.

Similarly, the stacked identifier 320 may be generated by projecting the infrastructure identifier 234-A onto an additional identifier that identifies the database 230 as belonging to the client. A service that composes a client resource is aware of the underlying service resource used to compose the stacked identifier. The service can use the identity of the underlying resource, map it to the client identifier it belongs to from its internal store, and then project a stacked identifier using that information.

The database 230 may use the stacked identifier 320 to make a signed request (e.g., a request to send a file to the object storage system 240). The signed request includes the identity of the caller. In this example, the stacked identifier includes a public key counterpart of an ephemeral key pair generated and used as part of authenticating the stacked identifier, and the payload specific to the target. In this example, a database instance sends a file to an object store target. The whole request can be signed as per a Cloud Infrastructure (CI) signing specification using the private key counterpart of the ephemeral key pair.

In some embodiments, a request may be signed using a credential that is periodically rotated (e.g., every 20 minutes through a Public Key Infrastructure (PKI) service). PKI services can include a certificate authority that can issue certificates within the cloud Infrastructure trusted by the Identity System in that Infrastructure. OCI uses a proprietary PKI service custom built for this purpose. Further, since the database 230 is implemented using additional compute instances (232-B and 232-C), the stacked identifier 320 may also have the infrastructure identifiers 234-B and 234-C projected onto it. However, in some embodiments, a separate stacked identifier may be generated for each underlying infrastructure resource.

As indicated above, a stacked identifier can enable a logical resource (in actuality, an underlying resource upon which the logical resource is built, such as the compute instance 222) to make a signed request to another resource (e.g., compute instance 236-A) while presenting itself as a logical resource belonging to a particular container (e.g., as being the client's load balancer). Thus, stacked identifiers provide a mechanism for separating the authority of the underlying resource from the intent or purpose for which the underlying resource is to be used. This minimizes the risk of a confused deputy problem since the underlying resource may be prevented from being granted more authority than the logical resource upon which it is built when the underlying resource uses the stacked identifier to act as the logical resource (e.g., based upon an access policy that is specified by the client and defines access privileges for a dynamic group of resource principals, where the client specifies rules for determining which resource principals are members of the dynamic group). Additionally, since stacked identifiers provide a way for the client to, in effect, define access privileges for underlying resources, the use of stacked identifiers further reduces the number of credentials and special relationships to be maintained for the resources.

Figure 4:
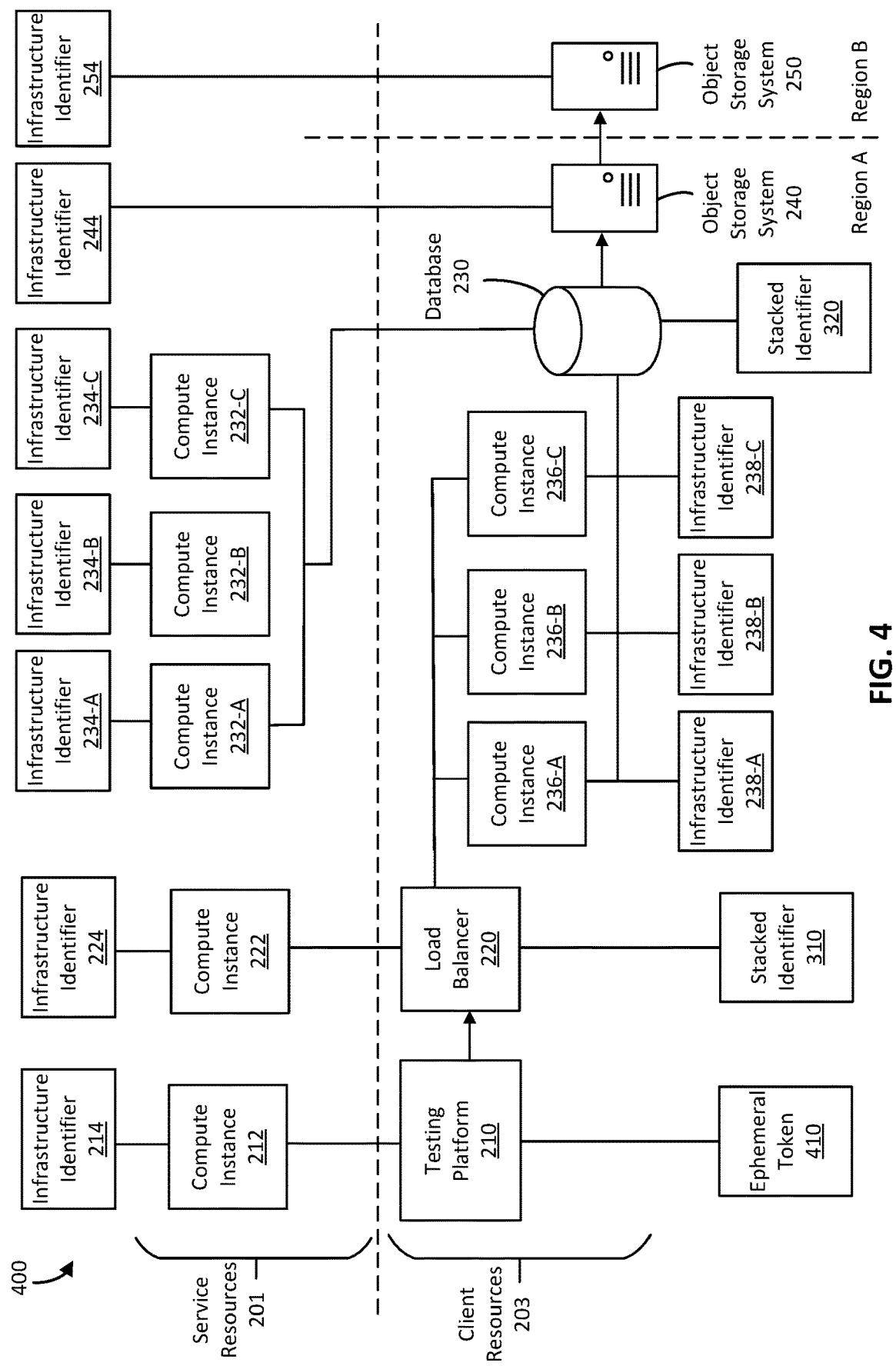
FIG. 4 illustrates an example of a cloud service architecture with an ephemeral token, in accordance with one or more embodiments.

FIG. 4 illustrates an example of a cloud service architecture 400 with an ephemeral (short-lived) token, in accordance with one or more embodiments. The ephemeral token is generated by the caller as part of authentication. For example, an ephemeral token can be generated during browser authentication. Generation of an ephemeral token is described at, for example, U.S. application Ser. No. 17/069,561 filed Oct. 13, 2020, titled "Browser Login Sessions Via Non-Extractable Asymmetric Keys," which is incorporated herein by reference in its entirety.

The cloud service architecture 400 is similar to cloud service architecture 300 in FIG. 3, but includes an ephemeral token 410 issued to the testing platform 210. Ephemeral tokens are time-limited tokens of relatively short duration (e.g., 5 minutes) that are presentable for obtaining access to a resource (e.g., as part of an access request signed using a credential associated with the requesting resource). In certain embodiments, ephemeral tokens are issued for resource principals configured to access resources for a brief period of time. For example, testing platform 210 may be configured to, as part of providing a function service under an FaaS model, execute a client-supplied software function one time or periodically (e.g., on a weekly basis or in response to an event trigger), where the function accesses one or more of the compute instances 236-A to 236C and runs for 30 seconds each time before terminating. Ephemeral tokens are especially useful for controlling access by resources that are not controlled by the cloud service provider (e.g., resources separate from the underlying infrastructure). In the example of the testing platform 210, the function executed by the testing platform 210 can be considered to be an ephemeral resource principal executed within its own container.

As indicated above, ephemeral tokens can be used to make a signed request for accessing a resource. For example, the testing platform 210 may include the ephemeral token 410 in a request to access compute instance 236-A, where the request is signed using a credential associated with the function to be executed. Therefore, in usage ephemeral tokens operate similarly to stacked identifiers. However, unlike stacked identifiers, ephemeral tokens are not tied to the identity of the underlying resource. As an analogy, an ephemeral token is like a receipt issued by a coffee store upon making a purchase, where the receipt entitles the person holding the receipt to a free coffee later on the same day. It is implied that the person holding the receipt is a customer of the coffee store, but the person holding the receipt can simply present the receipt to get the free coffee without providing any other form of identification. In essence, an ephemeral token enables a resource principal (e.g., the function executed by the testing platform 210) to assert that the resource principal belongs to a particular logical container (e.g., a client tenancy) in order to access some other resource in the logical container.

Figure 5:
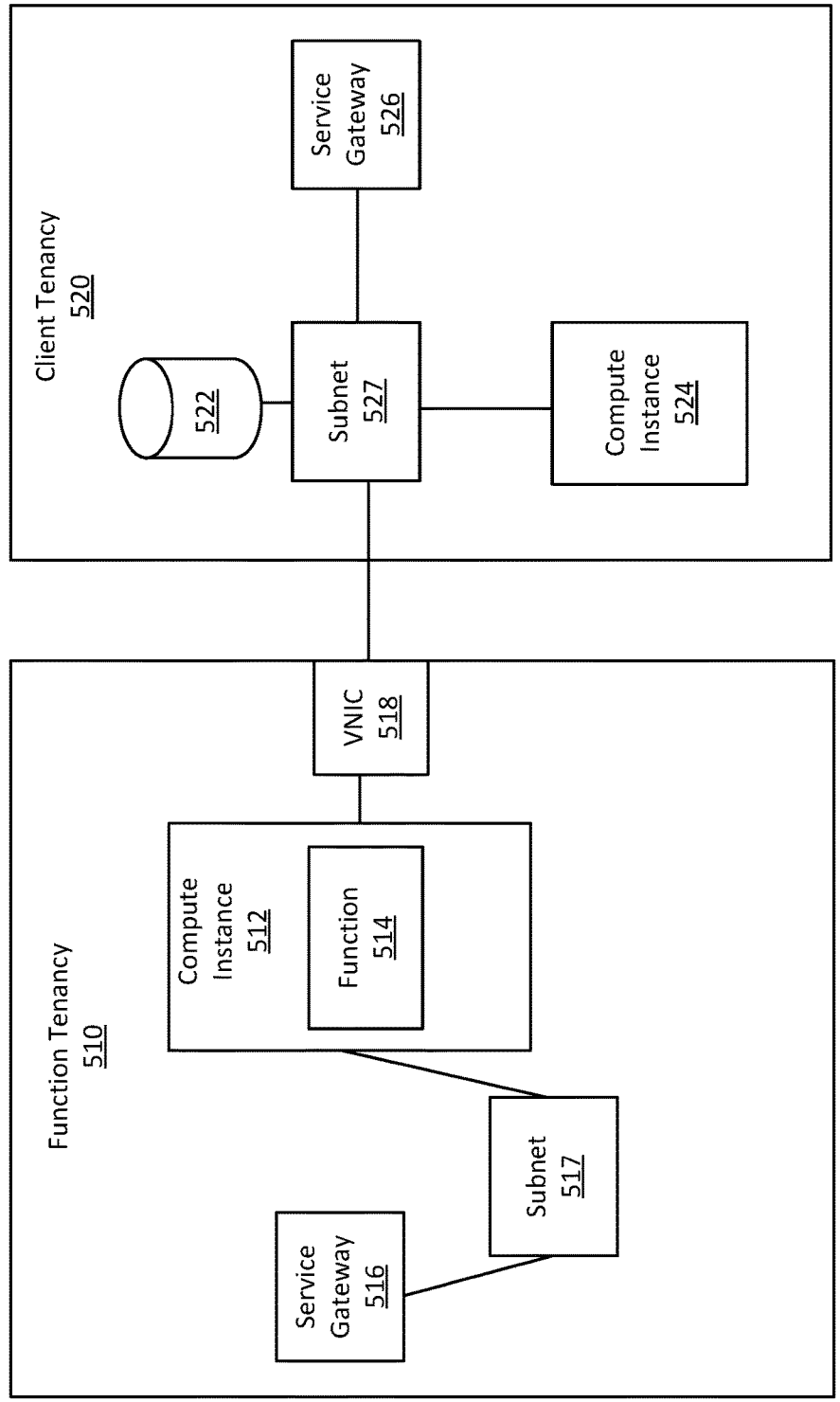
FIG. 5 illustrates an example of a cloud computing environment featuring a short-lived resource principal, in accordance with one or more embodiments.

FIG. 5 illustrates an example of a cloud computing environment 500 featuring an short-lived resource principal, in accordance with one or more embodiments. A short-lived resource principal can include a security principal of an instance of Functions as a Service resource. These can include lambda functions that are instantiated for a fleeting amount of time. For example, instantiated for an amount of time needed to make a single calculation whose results may be used in a bigger workflow.

Cloud computing environment 500 includes a function tenancy 510 and a client tenancy 520. The function tenancy 510 may be managed by a function service (e.g., an FaaS service as one of the cloud services 150 in FIG. 1), and the function service may allocate a compute instance 512 in the function tenancy 510 for executing a function 514. For example, compute instance 512 may correspond to an implementation of the compute instance 512 in FIG. 4.

As illustrated in FIG. 5, the compute instance 512 is coupled to a service gateway 516 via a subnet 517. The compute instance 512 may communicate with one or more services (e.g., the function service) through the service gateway 516. Further, the compute instance 512 is coupled to a subnet 527 in the client tenancy 520 through a virtual network interface card (VNIC) 518.

The subnet 527 may be a private network (e.g., a virtual private network) through which components in the client tenancy 520 communicate with each other. For example, as shown in FIG. 5, the subnet 527 may couple a database 522 (e.g., the database 230 in FIG. 4), a compute instance 524

(e.g., one of the compute instances 236-A to 236-C), and a service gateway 526. The function 514 may use the VNIC 518 to communicate with one or more of the components in the client tenancy 520. For instance, the function 514 may access the compute instance 524 through the VNIC 518 and the subnet 527. The client tenancy 520 may not have network connectivity into the function tenancy 510. However, the client tenancy 520 may access one or more services (e.g., another one of the cloud services 150 in FIG. 1) through the service gateway 526.

As discussed above, ephemeral tokens are one way in which a resource within a logical container (e.g., the function 514 in function tenancy 510) can access a resource in another logical container (e.g., database 522 or compute instance 524 in client tenancy 520) based upon identifying itself as being a resource belonging to the other logical container. Therefore, even though the compute instance 512 may be invisible from the perspective of the client tenancy 520, the client associated with the client tenancy 520 can write an access policy that authorizes functions belonging to the client tenancy 520 (e.g., the function 514, based upon an ephemeral token) to access a resource in the client tenancy 520.

Figure 6:
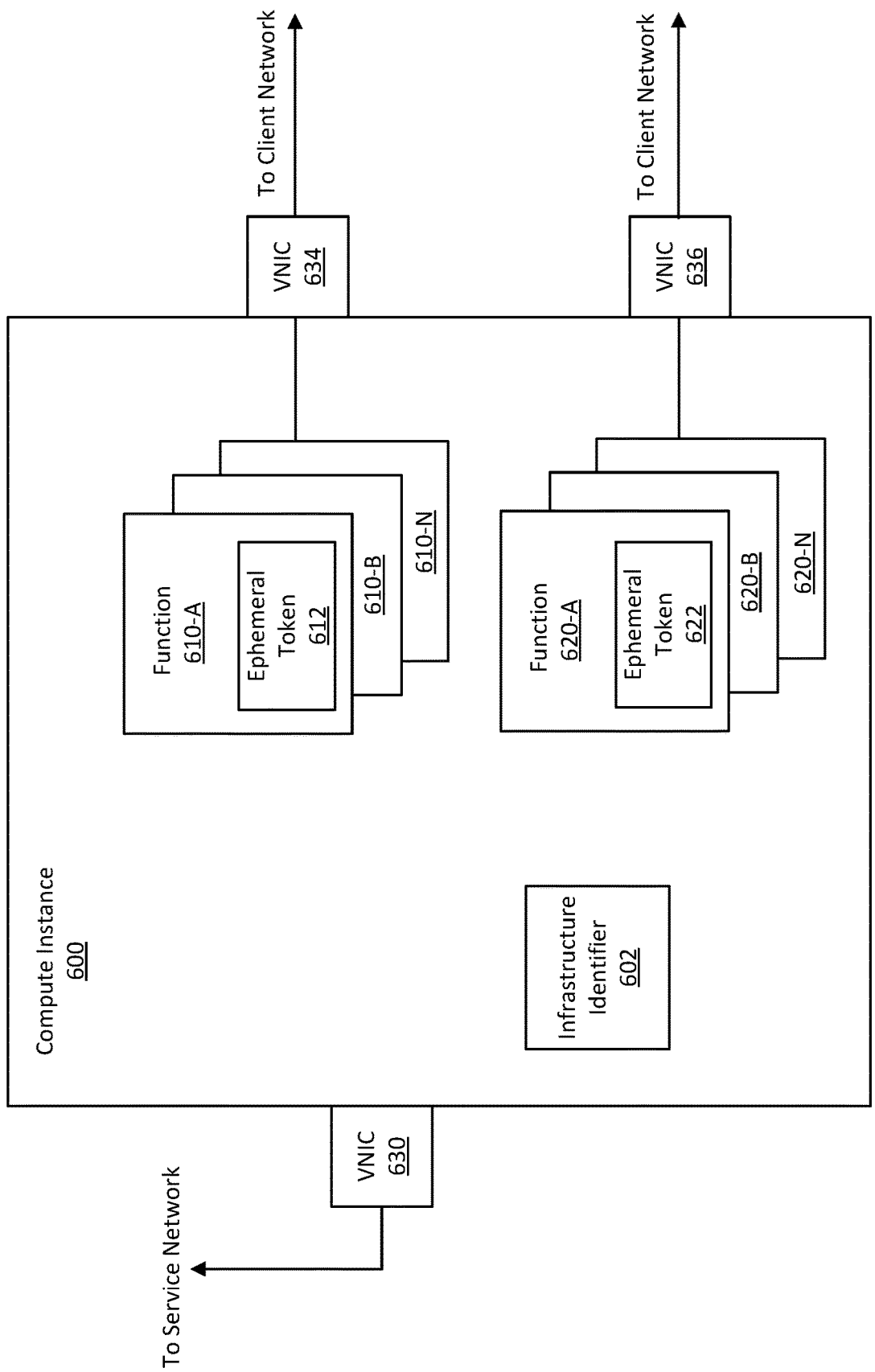
FIG. 6 illustrates an example of a compute instance configured to execute software code under a Functions as a Service (FaaS) model, in accordance with one or more embodiments.

FIG. 6 illustrates an example of a compute instance 600 configured to execute software code under an FaaS model, in accordance with one or more embodiments. The compute instance 600 is coupled to a service network (e.g., subnet 517 in FIG. 5) through a VNIC 630 and may correspond to an implementation of the compute instance 512. In the example of FIG. 6, the compute instance 600 is configured to execute multiple functions 610 and 620. For instance, the functions 610, 620 may involve different software code. Function 610 may communicate with a client network (e.g., subnet 527) through a VNIC 634. Similarly, function 620 may communicate with a client network (e.g., subnet 527 or a subnet in a client tenancy other than client tenancy 520) through a VNIC 636. Further, there may be multiple instances of function 610 (e.g., 610-A to 610-N) and multiple instances of function 620 (e.g., 620-A to 620-N). Each function instance can be configured to execute in its own container and may be invoked by the compute instance 600 in response to one or more conditions, such as time-based conditions (e.g., scheduled one-time execution or recurring execution) and/or event-based conditions (e.g., reading or writing to a database, or occurrence of some other operation with respect to a particular resource).

As shown in FIG. 6, the compute instance 600 may be assigned an infrastructure identifier 602. Additionally, each instance of function 610 may be issued an ephemeral token 612 that permits the function 610 to access a resource in a client tenancy via the VNIC 634. Similarly, each instance of function 620 may be issued an ephemeral token 622 that permits the function 620 to access a resource in a client tenancy via the VNIC 636. In some embodiments, ephemeral tokens issued to resource principals of the same category may include a shared identifier. For example, the function instances 610-A to 610-N may each be issued a separate ephemeral token 612, but each ephemeral token 612 may indicate that the bearer of the ephemeral token is a particular type of function.

Further, each function instance may be associated with a credential (e.g., a public-private key pair) usable for uniquely identifying the function instance. For example, the function 610 may be configured to maintain a private key and a corresponding public key while the function 610 is executing, where the private key is accessible to the function 610, but not to other components within the compute instance 600. Accordingly, when the function 610 finishes executing, the private key and the private key may automatically expire.

In certain embodiments, a service control plane manages resources. The service control plane may include a set of hardware and/or software components responsible for allocating resources in connection with providing a particular service. For example, a database control plane may allocate database resources, and a function control plane may generate function instances. When resources are managed thorough a service control plane, tokens can be issued to the resources based upon communication between an identity manager (e.g., IAM system 140 in FIG. 1) and the service control plane. For example, IAM system 140 may assign the infrastructure identifier 602 to compute instance 600 prior to the compute instance 600 being allocated for use within a function service, and the function control plane may, as part of invoking the function 610, communicate a request to the IAM system 140 for the ephemeral token 612. In response to the request, the IAM system 140 may generate the ephemeral token 612 and send it function control plane, which then stores the ephemeral token 612 for the function 610. Alternatively, in other embodiments, a resource principal may be configured to request an ephemeral token for itself. For example, the function 610 may be configured to execute bootstrap code that causes the function 610 to communicate a request to the IAM system 140 for the ephemeral token 612. The bootstrap code may be executed each time the function 610 is invoked. In yet another embodiment, the service control plane may generate an ephemeral token without communicating with an identity manager.

Functions 610 and 620 may be isolated within their respective containers so as not to have access to the infrastructure identifier 602, and thus may not be able to present themselves under the identity of the compute instance 600. Therefore, the network connectivity of the functions 610 and 620 may be limited to one or more client tenancies. However, the compute instance 600 can use the infrastructure identifier 602 to present itself as being an instance principal, for example, in connection with a request sent via the VNIC 630 for accessing a service provided through the service network.

Figure 7:
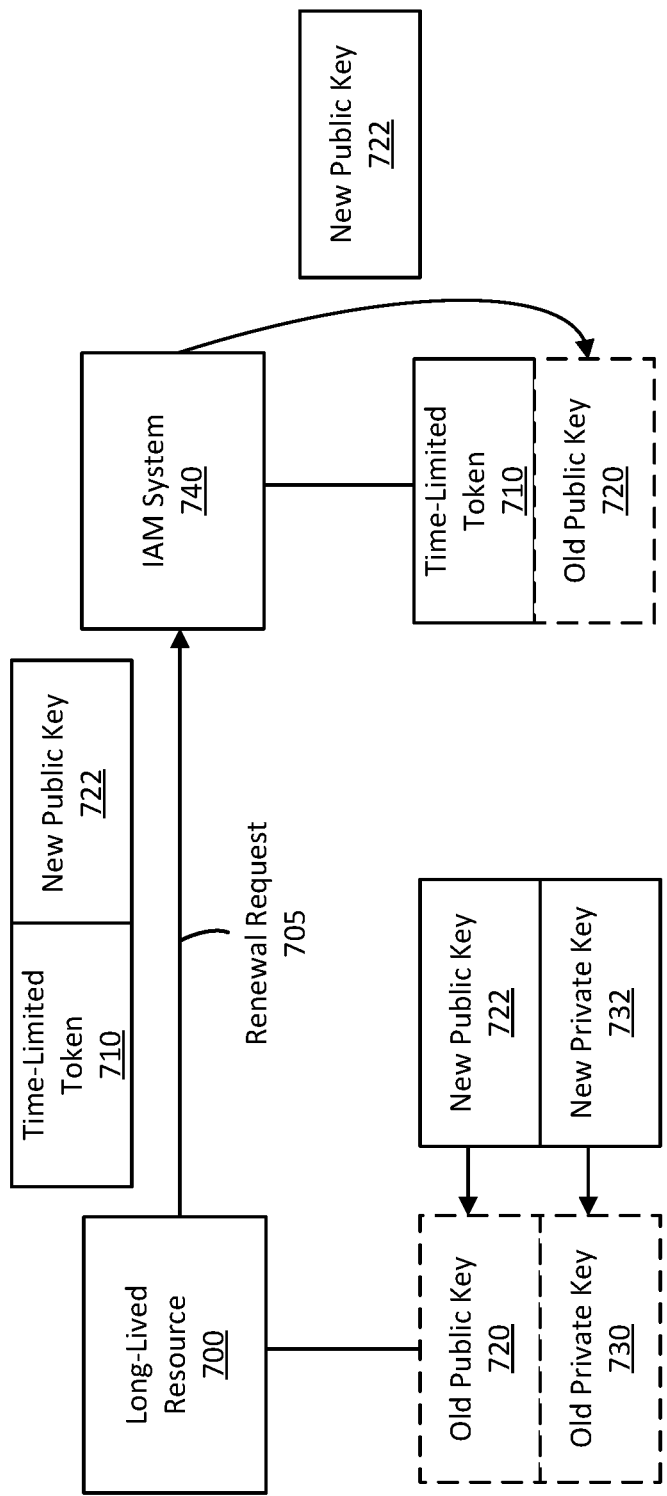
FIG. 7 illustrates an example of a token renewal mechanism for extending the duration in which a resource principal can access another resource, in accordance with one or more embodiments.

FIG. 7 illustrates an example of a token renewal mechanism for extending the duration in which a resource principal can access another resource, in accordance with one or more embodiments. The token renewal mechanism illustrated in FIG. 7 permits a resource principal to renew a time-limited token. The token renewal mechanism is useful for resource principals that are relatively longer lived, including resource principals that are continuously operating or require access for an extended period of time (e.g., hours or days). Because a long-lived resource principal may require extended access, the time-limited token issued to a long-lived resource principal may have a validity period that is longer than that of an ephemeral token issued to an ephemeral resource principal (e.g., 2 hours instead of 5 minutes). In either case, the token is time-limited and may include a timestamp usable for determining whether the token has expired. For example, the ephemeral tokens 612 and 622 in FIG. 6 and a time-limited token 710 issued to a long-lived resource 700 may each include a timestamp indicating when the token was issued and/or a timestamp indicating when the token expires.

As shown in FIG. 7, the long-lived resource 700 may have associated with it a key pair including a private key and a corresponding public key. The private key and the public key may be generated automatically (e.g., by the long-lived resource 700) through a key rotation algorithm. Alternatively, the private key and the public key can be manually generated by an entity controlling the long-lived resource 700 (e.g., by a user associated with a tenancy in which the long-lived resource belongs). The long-lived resource 700 may keep the private key a secret while sharing the public key with other components within a cloud environment. The public key may be associated with the time-limited token 710 issued to the long-lived resource 700. For example, as illustrated in FIG. 7, an IAM system 740 may store an association between the time-limited token 710 and an old public key 720. Due to this stored association, the IAM system 740 can recognize the long-lived resource 700 based upon the old public key 720. For instance, when the long-lived resource 700 sends a request for access to another resource or a renewal request 705 for renewing the time-limited token 710, the long-lived resource 700 may digitally sign the request using its existing private key (e.g., an old private key 730). The IAM system 740 can use the old public key 720 to verify the digital signature in the request, thereby confirming that the request is from the long-lived resource 700.

The renewal request 705 may include a copy of the time-limited token 710 and a new public key 722 generated for the long-lived resource 700. The new public key 722 may be generated together with a new private key 732. As with the old private key 730, the long-lived resource 700 may keep the new private key 732 secret. As indicated above, the renewal request 705 may be digitally signed using the old private key 730. Accordingly, upon receiving the renewal request 705, the IAM system 740 can use the old public key 720 to verify the digital signature in the renewal request 705. If the verification is successful, the IAM system 740 may update the stored association so that the time-limited token 710 is associated with the new public key 722 (as provided in the renewal request 705) instead of being associated with the old public key 720. This would enable the IAM system 740 to recognize the long-lived resource 700 based upon the new public key 722 for any subsequent requests from the long-lived resource 700. In some embodiments, the IAM system 740 may also compare the time-limited token included in the renewal request 705 to the time-limited token stored by the IAM system to, as a condition for updating the stored association, verify that both tokens are the same token 710.

The long-lived resource 700 may be subject to a mandatory key rotation policy that dictates the maximum lifetime of the key pair. The validity period of the time-limited token 710 can be at least as long as the maximum lifetime of the key pair. For example, the key rotation policy may specify that the public key or both the public key and the private key should be changed every 12 hours, while the time-limited token 710 may be valid for 24 hours. Alternatively, the validity period of the time-limited token 710 could be of the same duration as the maximum lifetime of the key pair. In either case, the time-limited token 710 can be kept valid indefinitely as long as the key pair continues to be updated. If the key pair is not updated within the lifetime of the key pair (e.g., the IAM system 740 does not receive a renewal request within 12 hours of the most recent rotation), the IAM system 740 may deem the key pair to be expired. Based upon the time-limited token 710 being associated with the now-expired key pair, the IAM system 740 may invalidate the time-limited token 710.

Key rotation based renewal of a time-limited token also enables the IAM system 740 to determine that a credential (e.g., the private key) associated with the resource to which the time-limited token is assigned has been compromised. For example, the IAM system 740 may determine that the old private key 730 was compromised if a digital signature in a request (e.g., an access request or a renewal request) cannot be verified based upon the public key currently associated with the time-limited token 710. This could occur because the request is signed using the old private key 730 and therefore the signature cannot be verified using the new public key 722. When the credential is determined to be comprised, the IAM system 740 will not recognize the sender of the request, and the request fails (e.g., the IAM system 740 denies the renewal request or denies authorization for the access).

Further, if the credential is compromised before the long-lived resource 700 can make a renewal request, the window of time within which a third-party can use the time-limited token 710 is constrained according to the maximum lifetime dictated by the key rotation policy. For example, if the third-party stole the old private key 730 before the renewal request 705 is sent from the long-lived resource 700, the third-party would send its own renewal request in order to keep the time-limited token 710 valid. Assuming that the renewal request from the third-party is successful (e.g., because the third-party also stole the time-limited token 710), the stored association would be updated to reflect a new public key supplied by the third party. This means that the next time the long-lived resource 700 sends a renewal request (e.g., within 12 hours of the last renewal request from the long-lived resource 700), the IAM system 740 will not recognize the long-lived resource 700, and the renewal request from the long-lived resource 700 would fail. In such situations, the entity to whom the long-lived resource 700 belongs (e.g., a particular client) may notify the cloud service provider that there is a problem with the long-lived resource 700, and the cloud service provider may respond by, for example, blacklisting the long-lived resource 700 to prevent it from interacting with other resources.

Time-based key pairs are merely one example of a type of credential that can be used to renew a token based upon a stored association between the credential and the token. For example, in some embodiments, a resource may be manually assigned a digital certificate (e.g., a PKI certificate) containing a resource identifier and other information when the resource is instantiated. The digital certificate may have a fixed lifetime and may be generated based upon a public key issued to the resource and a private key associated with a certificate authority (e.g., the cloud infrastructure provider or a publicly recognized certificate authority external to the cloud infrastructure system), where the private key is used to sign the digital certificate. The public key may be rotated based upon communication between the certificate authority and the resource or between the certificate authority and the service managing the resource, but the stored association may be between the token and the digital certificate, not the token and the public key.

Figure 8:
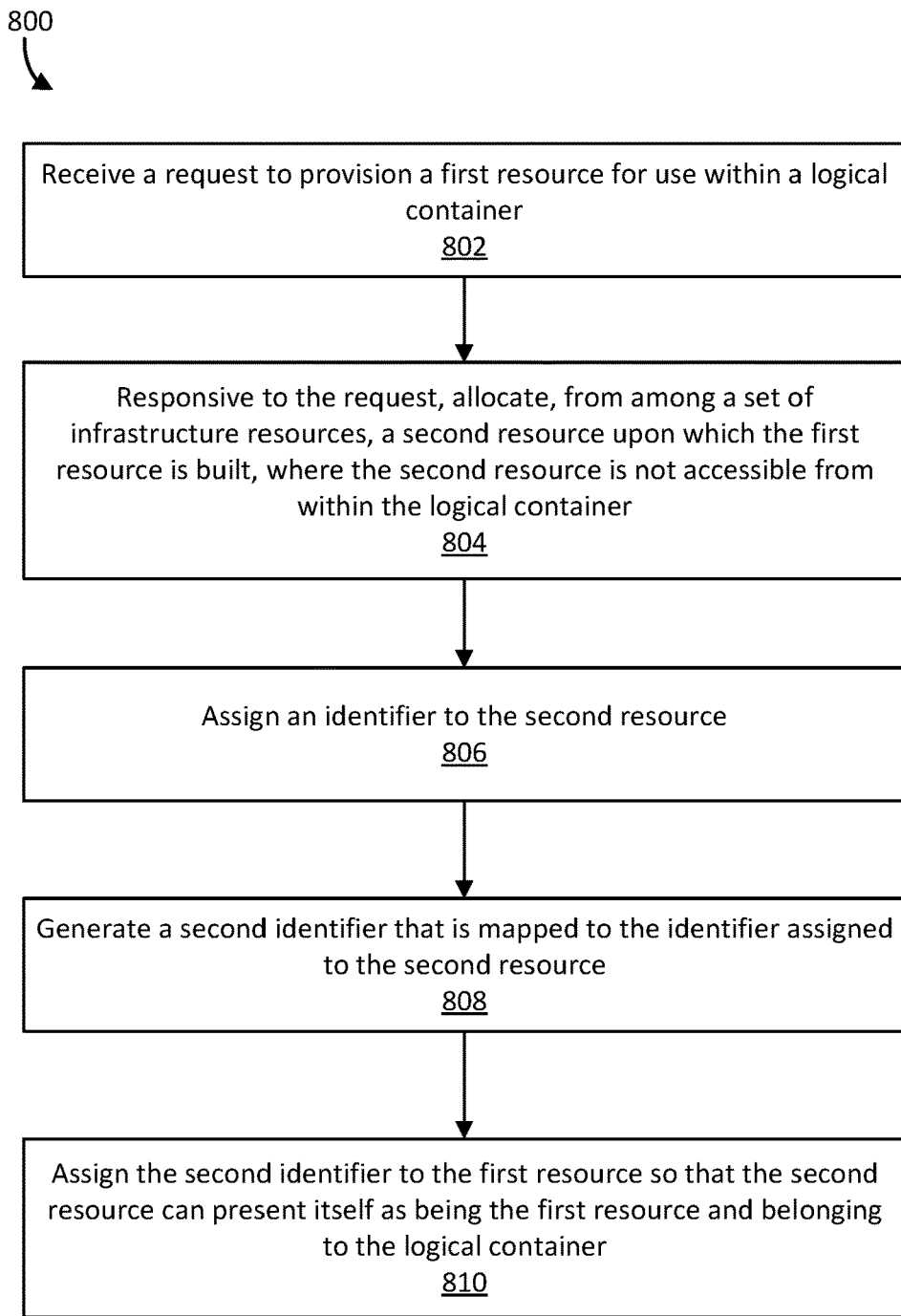
FIG. 8 is a simplified flowchart depicting a process for enabling a resource to access another resource, according to certain embodiments.

FIG. 8 is a simplified flowchart depicting a process 800 for enabling a resource to access another resource, according to certain embodiments. The process depicted in FIG. 8 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 8 and described below is intended to be illustrative and non-limiting. Although FIG. 8 depicts the various processing steps occurring in a particular sequence or order, this is not intended to be limiting. In certain alternative embodiments, the steps may be performed in some different order or some steps may also be performed in parallel. In certain embodiments, the processing depicted in FIG. 8 may be performed by a cloud infrastructure system such as the cloud infrastructure system 105 shown in FIG. 1. More particularly, the processing depicted in FIG. 8 may be performed at least in part by an identity manager within the cloud infrastructure system (e.g., IAM system 140).

As shown in FIG. 8, at 802, a request to provision a first resource for use within a logical container (e.g., a client tenancy) is received. For example, the request may be a request for a database to be instantiated in the client's tenancy and using a certain number of compute instances. The request may be received by the cloud infrastructure system from a computing device operated by a user associated with the logical container.

At 804, a second resource, upon which the first resource is built, is allocated from among a set of infrastructure resources in response to the request in 802. The allocation can be performed by the service exposing the second resource, which is used by the service composing the first resource. In this example, the compute service allocates a compute instance upon a request from the database service which builds a database on top of the compute instance.

For example, the second resource may be a compute instance that will be configured to operate as the first resource (e.g., a database). Configuration of the second resource may involve operations such as copying software to a memory of the second resource (e.g., a default or client-supplied operating system and/or a service-specific software application), setting appropriate network connections for the second resource, and the like.

At 806, an identifier is assigned to the second resource. The identifier may be assigned prior to receiving the request in 802. The identifier can be assigned by the service exposing the resource. The identifier is a unique identifier which maps to metadata that the service may persist in its store. The store can include certain attributes such as name, time of creation, and the container in which it is created.

The IAM system 140 may generate identifiers for each compute instance in the cloud infrastructure system before the compute instance is allocated for use as part of providing a cloud service. Alternatively, the identifier may be assigned after receiving the request in 802. For example, the IAM system 140 may generate and assign the identifier during configuration of the second resource (e.g., during bootloading of the compute instance). As indicated above, infrastructure resources may not be visible to clients. Therefore, the second resource may not be accessible from within the logical container (e.g., to another resource in the logical container). Similarly, the second resource may not be able to access another resource in the logical container.

At 808, a second identifier is generated (e.g., by the IAM system 140). The second identifier can be generated by the service processing the request to allocate the first resource. The second identifier can be the identifier of the first resource, but internally it is mapped to the second resource from which it is composed. The second identifier can be an identifier that is mapped to the identifier assigned in 806. For example, in the embodiment of FIG. 3, the identifier assigned in 806 may correspond to infrastructure identifier 224 or infrastructure identifier 234-A, and the second identifier may correspond to one of the stacked identifiers 310, 320.

At 810, the second identifier from 808 is assigned to the first resource. Due to the second identifier being mapped to the identifier assigned to the second resource, the second resource is able to present itself as being the first resource and belonging to the logical container. For example, as discussed above, assigning stacked identifier 320 to the database 230 may permit the compute instance 232-A to make a signed request to object storage system 240 while presenting itself as being a database belonging to a particular client tenancy.

Figure 9:
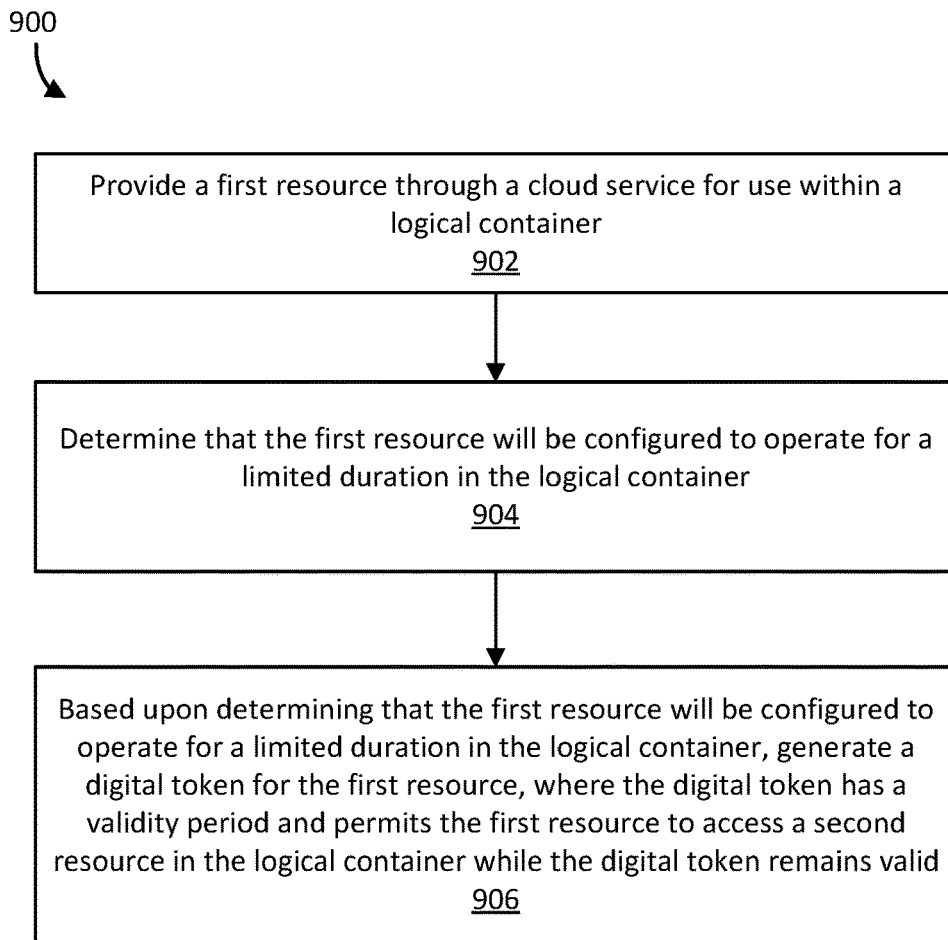
FIG. 9 is a simplified flowchart depicting a process for limiting the duration of access for a resource, according to certain embodiments.

FIG. 9 is a simplified flowchart depicting a process 900 for limiting the duration of access for a resource, according to certain embodiments. The process depicted in FIG. 9 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 9 and described below is intended to be illustrative and non-limiting. Although FIG. 9 depicts the various processing steps occurring in a particular sequence or order, this is not intended to be limiting. In certain alternative embodiments, the steps may be performed in some different order or some steps may also be performed in parallel. In certain embodiments, the processing depicted in FIG. 9 may be performed by a cloud infrastructure system such as the cloud infrastructure system 105, as shown in FIG. 1. More particularly, the processing depicted in FIG. 9 may be performed at least in part by an identity manager within the cloud infrastructure system (e.g., IAM system 140).

As shown in FIG. 9, at 902, a first resource is provided through a cloud service for use within a logical container. For example, the first resource may be a software function provided to client tenancy as part of a function service, and may be executed on a compute instance that is also provided as part of the function service. Providing the first resource may involve operations such as copying the software function to a memory of the compute instance on which the software function will execute, invoking the software function through a control plane associated with the function service, setting appropriate network connections for the software function, and the like.

At 904, a determination is made that the first resource will be configured to operate for a limited duration in the logical container. The determination can be made by the service exposing the resource. For example, the control plane associated with the function service may receive an indication from a client device (e.g., as part of a request for provisioning the first resource) that the first resource is a short-lived resource.

At 906, based upon the determination that the first resource will be configured to operate for a limited duration in the logical container, a digital token (e.g., the ephemeral token 410 in the embodiment of FIG. 4) is generated for the first resource. For example, based upon receiving the indication that the first resource is a short-lived resource, the control plane may communicate a request to the IAM system 140 for issuing the digital token. Upon receiving the request from the control plane, the IAM system 140 may generate the digital token and communicate the digital token to the control plane for storage by the first resource (e.g., in a runtime memory allocated to the software function).

As discussed earlier, an ephemeral token can have a relatively short validity period and can permit a short-lived resource permission to access another resource in the logical container (e.g., another compute instance in the client tenancy) as long as the digital token remains valid. The validity period may be configured such that it is slightly longer than needed for the short-lived resource to complete its operation (e.g., a validity period of 5 minutes), but short enough to compensate for the risk that the digital token could become compromised. Additionally, as indicated above, in order to access another resource, the short-lived resource may authenticate based upon a credential (e.g., a public-private key pair) associated with the short-lived resource, but such a credential may automatically expire along with the short-lived resource (e.g., because the credential is stored together with the digital token in the runtime memory allocated to the software function).

FIG. 10 is a simplified flowchart depicting a process 1000 for limiting the duration of access for a resource, according to certain embodiments. The process depicted in FIG. 10 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 10 and described below is intended to be illustrative and non-limiting. Although FIG. 10 depicts the various processing steps occurring in a particular sequence or order, this is not intended to be limiting. In certain alternative embodiments, the steps may be performed in some different order or some steps may also be performed in parallel. In certain embodiments, the processing depicted in FIG. 10 may be performed by a cloud infrastructure system such as the cloud infrastructure system 105, as shown in FIG. 1. More particularly, the processing depicted in FIG. 10 may be performed at least in part by an identity manager within the cloud infrastructure system (e.g., IAM system 740 in the embodiment of FIG. 7).

As shown in FIG. 10, at 1002, a digital token (e.g., the time-limited token 710 in FIG. 7) is generated for a first resource within a logical container (e.g., a database in a client tenancy). The digital token generated in 1002 has a validity period and permits the first resource to access a second resource in the logical container while the digital token remains valid. The digital token can be renewed according to the subsequent steps depicted in FIG. 10 so that the digital token can continue to be used for accessing the second resource.

At 1004, an association between the digital token and a first credential belonging to the first resource is stored. Due to the stored association, access to the second resource based upon the digital token is conditioned upon successful authentication of the first resource using the first credential. For example, as discussed above, IAM system 740 can associate the time-limited token 710 with the most recent public key communicated to the IAM system 740 by the long-lived resource 700 so that only requests signed using a corresponding private key are recognized as being sent from the long-lived resource 700.

At 1006, a request to renew the digital token is received. The request in 1006 includes a second credential different from the first credential. For example, the second credential may be a new public key generated by or on behalf of the first resource.

At 1008, a determination is made, using the first credential, that the request is from the first resource. For example as discussed above, the IAM system 740 may use an existing public key stored in association with the time-limited token 710 to verify a digital signature in a renewal request. If the verification is successful, this indicates that the sender of the renewal request has possession of a private key corresponding to the existing public key.

At 1010, the digital token is renewed in response to the determination in 1008. The renewing of the digital token may involve updating the stored association to replace the first credential with the second credential such that, for a subsequent request to access the second resource based upon the digital token, access is conditioned upon successful authentication of the first resource using the second credential. For example, in order to access the second resource, the first resource may send an access request that includes the digital token, where the access request is digitally signed using the latest private key, and where the digital signature is verified using the corresponding latest public key. In certain embodiments, the renewing of the digital token in 1010 may also involve resetting the validity period of the digital token.

Example Infrastructure as a Service Architectures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 11:
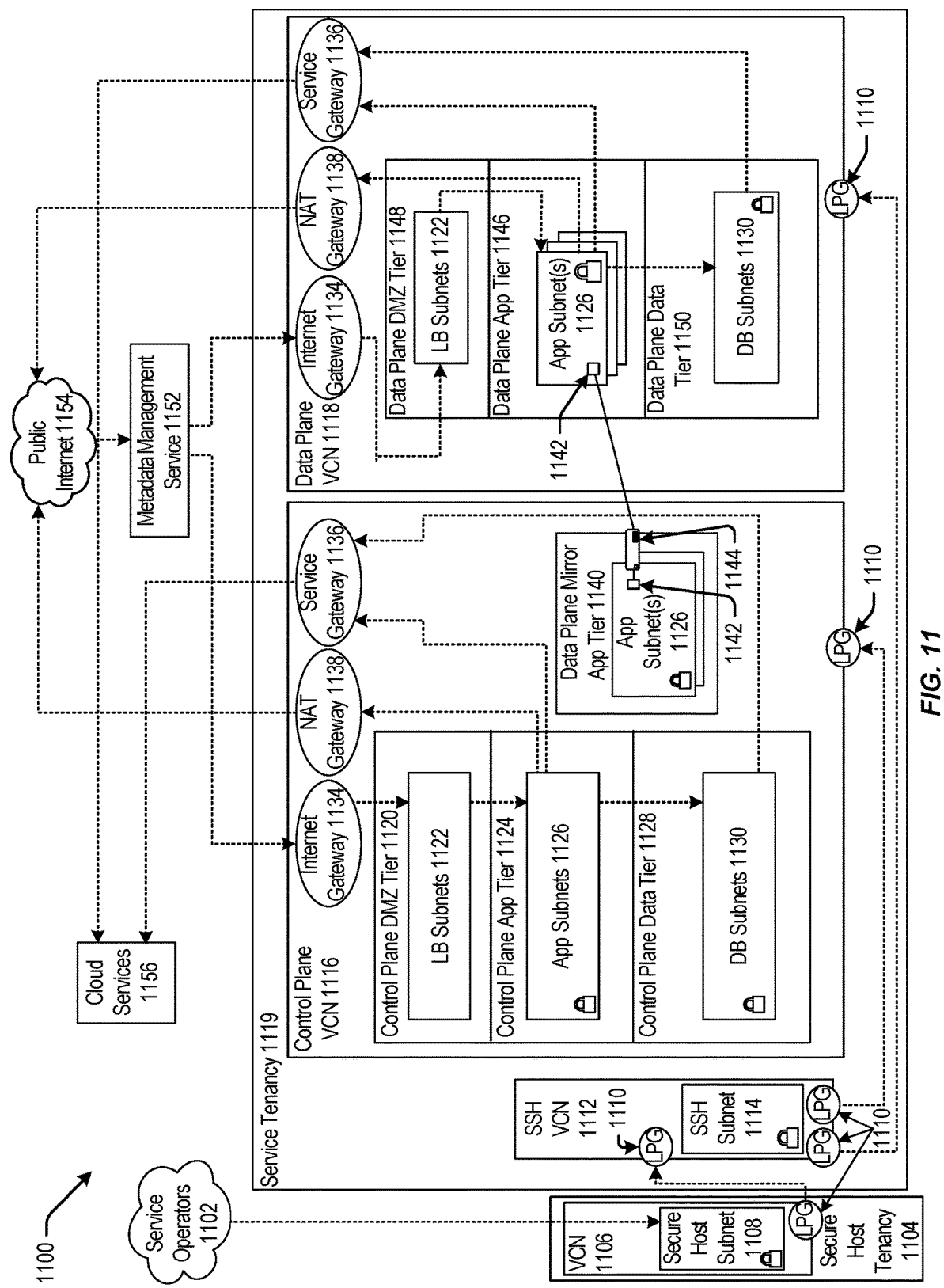
FIG. 11 is a block diagram illustrating one pattern for implementing a cloud infrastructure as a service system, according to at least one embodiment.

FIG. 11 is a block diagram 1100 illustrating an example pattern of an IaaS architecture, according to at least one embodiment. Service operators 1102 can be communicatively coupled to a secure host tenancy 1104 that can include a virtual cloud network (VCN) 1106 and a secure host subnet 1108. In some examples, the service operators 1102 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1106 and/or the Internet.

The VCN 1106 can include a local peering gateway (LPG) 1110 that can be communicatively coupled to a secure shell (SSH) VCN 1112 via an LPG 1110 contained in the SSH VCN 1112. The SSH VCN 1112 can include an SSH subnet 1114, and the SSH VCN 1112 can be communicatively coupled to a control plane VCN 1116 via the LPG 1110 contained in the control plane VCN 1116. Also, the SSH VCN 1112 can be communicatively coupled to a data plane VCN 1118 via an LPG 1110. The control plane VCN 1116 and the data plane VCN 1118 can be contained in a service tenancy 1119 that can be owned and/or operated by the IaaS provider.

The control plane VCN 1116 can include a control plane demilitarized zone (DMZ) tier 1120 that acts as a perimeter network (e.g., portions of a corporate network between the corporate intranet and external networks). The DMZ-based servers may have restricted responsibilities and help keep security breaches contained. Additionally, the DMZ tier 1120 can include one or more load balancer (LB) subnet(s) 1122, a control plane app tier 1124 that can include app subnet(s) 1126, a control plane data tier 1128 that can include database (DB) subnet(s) 1130 (e.g., frontend DB subnet(s) and/or backend DB subnet(s)). The LB subnet(s) 1122 contained in the control plane DMZ tier 1120 can be communicatively coupled to the app subnet(s) 1126 contained in the control plane app tier 1124 and an Internet gateway 1134 that can be contained in the control plane VCN 1116, and the app subnet(s) 1126 can be communicatively coupled to the DB subnet(s) 1130 contained in the control plane data tier 1128 and a service gateway 1136 and a network address translation (NAT) gateway 1138. The control plane VCN 1116 can include the service gateway 1136 and the NAT gateway 1138.

The control plane VCN 1116 can include a data plane mirror app tier 1140 that can include app subnet(s) 1126. The app subnet(s) 1126 contained in the data plane mirror app tier 1140 can include a virtual network interface controller (VNIC) 1142 that can execute a compute instance 1144. The compute instance 1144 can communicatively couple the app subnet(s) 1126 of the data plane mirror app tier 1140 to app subnet(s) 1126 that can be contained in a data plane app tier 1146.

The data plane VCN 1118 can include the data plane app tier 1146, a data plane DMZ tier 1148, and a data plane data tier 1150. The data plane DMZ tier 1148 can include LB subnet(s) 1122 that can be communicatively coupled to the app subnet(s) 1126 of the data plane app tier 1146 and the Internet gateway 1134 of the data plane VCN 1118. The app subnet(s) 1126 can be communicatively coupled to the service gateway 1136 of the data plane VCN 1118 and the NAT gateway 1138 of the data plane VCN 1118. The data plane data tier 1150 can also include the DB subnet(s) 1130 that can be communicatively coupled to the app subnet(s) 1126 of the data plane app tier 1146.

The Internet gateway 1134 of the control plane VCN 1116 and of the data plane VCN 1118 can be communicatively coupled to a metadata management service 1152 that can be communicatively coupled to public Internet 1154. Public Internet 1154 can be communicatively coupled to the NAT gateway 1138 of the control plane VCN 1116 and of the data plane VCN 1118. The service gateway 1136 of the control plane VCN 1116 and of the data plane VCN 1118 can be communicatively couple to cloud services 1156.

In some examples, the service gateway 1136 of the control plane VCN 1116 or of the data plan VCN 1118 can make application programming interface (API) calls to cloud services 1156 without going through public Internet 1154. The API calls to cloud services 1156 from the service gateway 1136 can be one-way: the service gateway 1136 can make API calls to cloud services 1156, and cloud services 1156 can send requested data to the service gateway 1136. But, cloud services 1156 may not initiate API calls to the service gateway 1136.

In some examples, the secure host tenancy 1104 can be directly connected to the service tenancy 1119, which may be otherwise isolated. The secure host subnet 1108 can communicate with the SSH subnet 1114 through an LPG 1110 that may enable two-way communication over an otherwise isolated system. Connecting the secure host subnet 1108 to the SSH subnet 1114 may give the secure host subnet 1108 access to other entities within the service tenancy 1119.

The control plane VCN 1116 may allow users of the service tenancy 1119 to set up or otherwise provision desired resources. Desired resources provisioned in the control plane VCN 1116 may be deployed or otherwise used in the data plane VCN 1118. In some examples, the control plane VCN 1116 can be isolated from the data plane VCN 1118, and the data plane mirror app tier 1140 of the control plane VCN 1116 can communicate with the data plane app tier 1146 of the data plane VCN 1118 via VNICs 1142 that can be contained in the data plane mirror app tier 1140 and the data plane app tier 1146.

In some examples, users of the system, or customers, can make requests, for example create, read, update, or delete (CRUD) operations, through public Internet 1154 that can communicate the requests to the metadata management service 1152. The metadata management service 1152 can communicate the request to the control plane VCN 1116 through the Internet gateway 1134. The request can be received by the LB subnet(s) 1122 contained in the control plane DMZ tier 1120. The LB subnet(s) 1122 may determine that the request is valid, and in response to this determination, the LB subnet(s) 1122 can transmit the request to app subnet(s) 1126 contained in the control plane app tier 1124. If the request is validated and requires a call to public Internet 1154, the call to public Internet 1154 may be transmitted to the NAT gateway 1138 that can make the call to public Internet 1154. Memory that may be desired to be stored by the request can be stored in the DB subnet(s) 1130.

In some examples, the data plane mirror app tier 1140 can facilitate direct communication between the control plane VCN 1116 and the data plane VCN 1118. For example, changes, updates, or other suitable modifications to configuration may be desired to be applied to the resources contained in the data plane VCN 1118. Via a VNIC 1142, the control plane VCN 1116 can directly communicate with, and can thereby execute the changes, updates, or other suitable modifications to configuration to, resources contained in the data plane VCN 1118.

In some embodiments, the control plane VCN 1116 and the data plane VCN 1118 can be contained in the service tenancy 1119. In this case, the user, or the customer, of the system may not own or operate either the control plane VCN 1116 or the data plane VCN 1118. Instead, the IaaS provider may own or operate the control plane VCN 1116 and the data plane VCN 1118, both of which may be contained in the service tenancy 1119. This embodiment can enable isolation of networks that may prevent users or customers from interacting with other users', or other customers', resources. Also, this embodiment may allow users or customers of the system to store databases privately without needing to rely on public Internet 1154, which may not have a desired level of security, for storage.

In other embodiments, the LB subnet(s) 1122 contained in the control plane VCN 1116 can be configured to receive a signal from the service gateway 1136. In this embodiment, the control plane VCN 1116 and the data plane VCN 1118 may be configured to be called by a customer of the IaaS provider without calling public Internet 1154. Customers of the IaaS provider may desire this embodiment since database(s) that the customers use may be controlled by the IaaS provider and may be stored on the service tenancy 1119, which may be isolated from public Internet 1154.

Figure 12:
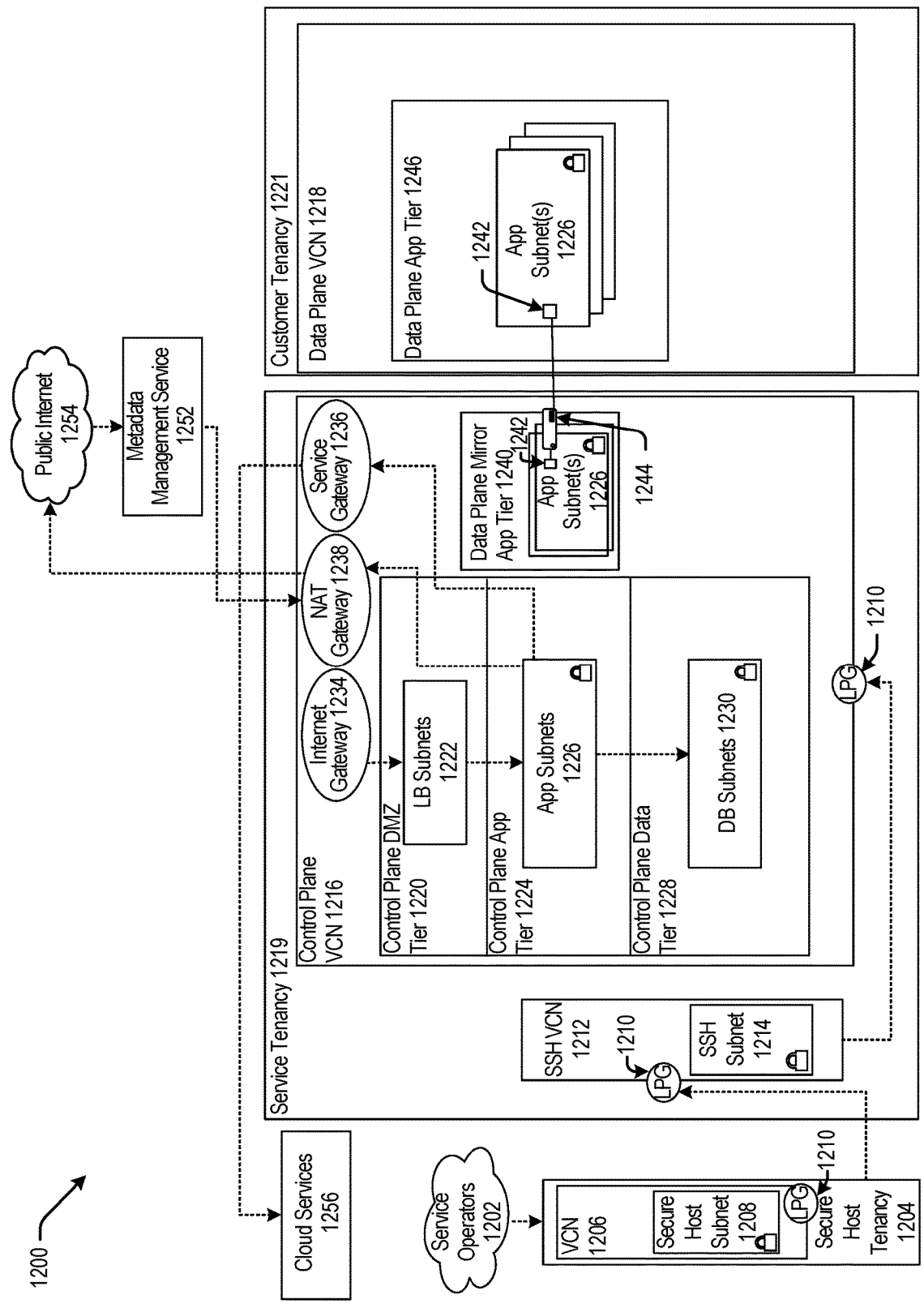
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g. service operators 1102 of FIG. 11) can be communicatively coupled to a secure host tenancy 1204 (e.g. the secure host tenancy 1104 of FIG. 11) that can include a virtual cloud network (VCN) 1206 (e.g. the VCN 1106 of FIG. 11) and a secure host subnet 1208 (e.g. the secure host subnet 1108 of FIG. 11). The VCN 1206 can include a local peering gateway (LPG) 1210 (e.g. the LPG 1110 of FIG. 11) that can be communicatively coupled to a secure shell (SSH) VCN 1212 (e.g. the SSH VCN 1112 of FIG. 11) via an LPG 1110 contained in the SSH VCN 1212. The SSH VCN 1212 can include an SSH subnet 1214 (e.g. the SSH subnet 1114 of FIG. 11), and the SSH VCN 1212 can be communicatively coupled to a control plane VCN 1216 (e.g. the control plane VCN 1116 of FIG. 11) via an LPG 1210 contained in the control plane VCN 1216. The control plane VCN 1216 can be contained in a service tenancy 1219 (e.g. the service tenancy 1119 of FIG. 11), and the data plane VCN 1218 (e.g. the data plane VCN 1118 of FIG. 11) can be contained in a customer tenancy 1221 that may be owned or operated by users, or customers, of the system.

The control plane VCN 1216 can include a control plane DMZ tier 1220 (e.g. the control plane DMZ tier 1120 of FIG. 11) that can include LB subnet(s) 1222 (e.g. LB subnet(s) 1122 of FIG. 11), a control plane app tier 1224 (e.g. the control plane app tier 1124 of FIG. 11) that can include app subnet(s) 1226 (e.g. app subnet(s) 1126 of FIG. 11), a control plane data tier 1228 (e.g. the control plane data tier 1128 of FIG. 11) that can include database (DB) subnet(s) 1230 (e.g. similar to DB subnet(s) 1130 of FIG. 11). The LB subnet(s) 1222 contained in the control plane DMZ tier 1220 can be communicatively coupled to the app subnet(s) 1226 contained in the control plane app tier 1224 and an Internet gateway 1234 (e.g. the Internet gateway 1134 of FIG. 11) that can be contained in the control plane VCN 1216, and the app subnet(s) 1226 can be communicatively coupled to the DB subnet(s) 1230 contained in the control plane data tier 1228 and a service gateway 1236 (e.g. the service gateway of FIG. 11) and a network address translation (NAT) gateway 1238 (e.g. the NAT gateway 1138 of FIG. 11). The control plane VCN 1216 can include the service gateway 1236 and the NAT gateway 1238.

The control plane VCN 1216 can include a data plane mirror app tier 1240 (e.g. the data plane mirror app tier 1140 of FIG. 11) that can include app subnet(s) 1226. The app subnet(s) 1226 contained in the data plane mirror app tier 1240 can include a virtual network interface controller (VNIC) 1242 (e.g. the VNIC of 1142) that can execute a compute instance 1244 (e.g. similar to the compute instance 1144 of FIG. 11). The compute instance 1244 can facilitate communication between the app subnet(s) 1226 of the data plane mirror app tier 1240 and the app subnet(s) 1226 that can be contained in a data plane app tier 1246 (e.g. the data plane app tier 1146 of FIG. 11) via the VNIC 1242 contained in the data plane mirror app tier 1240 and the VNIC 1242 contained in the data plan app tier 1246.

The Internet gateway 1234 contained in the control plane VCN 1216 can be communicatively coupled to a metadata management service 1252 (e.g. the metadata management service 1152 of FIG. 11) that can be communicatively coupled to public Internet 1254 (e.g. public Internet 1154 of FIG. 11). Public Internet 1254 can be communicatively coupled to the NAT gateway 1238 contained in the control plane VCN 1216. The service gateway 1236 contained in the control plane VCN 1216 can be communicatively couple to cloud services 1256 (e.g. cloud services 1156 of FIG. 11).

In some examples, the data plane VCN 1218 can be contained in the customer tenancy 1221. In this case, the IaaS provider may provide the control plane VCN 1216 for each customer, and the IaaS provider may, for each customer, set up a unique compute instance 1244 that is contained in the service tenancy 1219. Each compute instance 1244 may allow communication between the control plane VCN 1216, contained in the service tenancy 1219, and the data plane VCN 1218 that is contained in the customer tenancy 1221. The compute instance 1244 may allow resources, that are provisioned in the control plane VCN 1216 that is contained in the service tenancy 1219, to be deployed or otherwise used in the data plane VCN 1218 that is contained in the customer tenancy 1221.

In other examples, the customer of the IaaS provider may have databases that live in the customer tenancy 1221. In this example, the control plane VCN 1216 can include the data plane mirror app tier 1240 that can include app subnet(s) 1226. The data plane mirror app tier 1240 can reside in the data plane VCN 1218, but the data plane mirror app tier 1240 may not live in the data plane VCN 1218. That is, the data plane mirror app tier 1240 may have access to the customer tenancy 1221, but the data plane mirror app tier 1240 may not exist in the data plane VCN 1218 or be owned or operated by the customer of the IaaS provider. The data plane mirror app tier 1240 may be configured to make calls to the data plane VCN 1218 but may not be configured to make calls to any entity contained in the control plane VCN 1216. The customer may desire to deploy or otherwise use resources in the data plane VCN 1218 that are provisioned in the control plane VCN 1216, and the data plane mirror app tier 1240 can facilitate the desired deployment, or other usage of resources, of the customer.

In some embodiments, the customer of the IaaS provider can apply filters to the data plane VCN 1218. In this embodiment, the customer can determine what the data plane VCN 1218 can access, and the customer may restrict access to public Internet 1254 from the data plane VCN 1218. The IaaS provider may not be able to apply filters or otherwise control access of the data plane VCN 1218 to any outside networks or databases. Applying filters and controls by the customer onto the data plane VCN 1218, contained in the customer tenancy 1221, can help isolate the data plane VCN 1218 from other customers and from public Internet 1254.

In some embodiments, cloud services 1256 can be called by the service gateway 1236 to access services that may not exist on public Internet 1254, on the control plane VCN 1216, or on the data plane VCN 1218. The connection between cloud services 1256 and the control plane VCN 1216 or the data plane VCN 1218 may not be live or continuous. Cloud services 1256 may exist on a different network owned or operated by the IaaS provider. Cloud services 1256 may be configured to receive calls from the service gateway 1236 and may be configured to not receive calls from public Internet 1254. Some cloud services 1256 may be isolated from other cloud services 1256, and the control plane VCN 1216 may be isolated from cloud services 1256 that may not be in the same region as the control plane VCN 1216. For example, the control plane VCN 1216 may be located in "Region 1," and cloud service "Deployment 11," may be located in Region 1 and in "Region 2." If a call to Deployment 11 is made by the service gateway 1236 contained in the control plane VCN 1216 located in Region 1, the call may be transmitted to Deployment 11 in Region 1. In this example, the control plane VCN 1216, or Deployment 11 in Region 1, may not be communicatively coupled to, or otherwise in communication with, Deployment 11 in Region 2.

Figure 13:
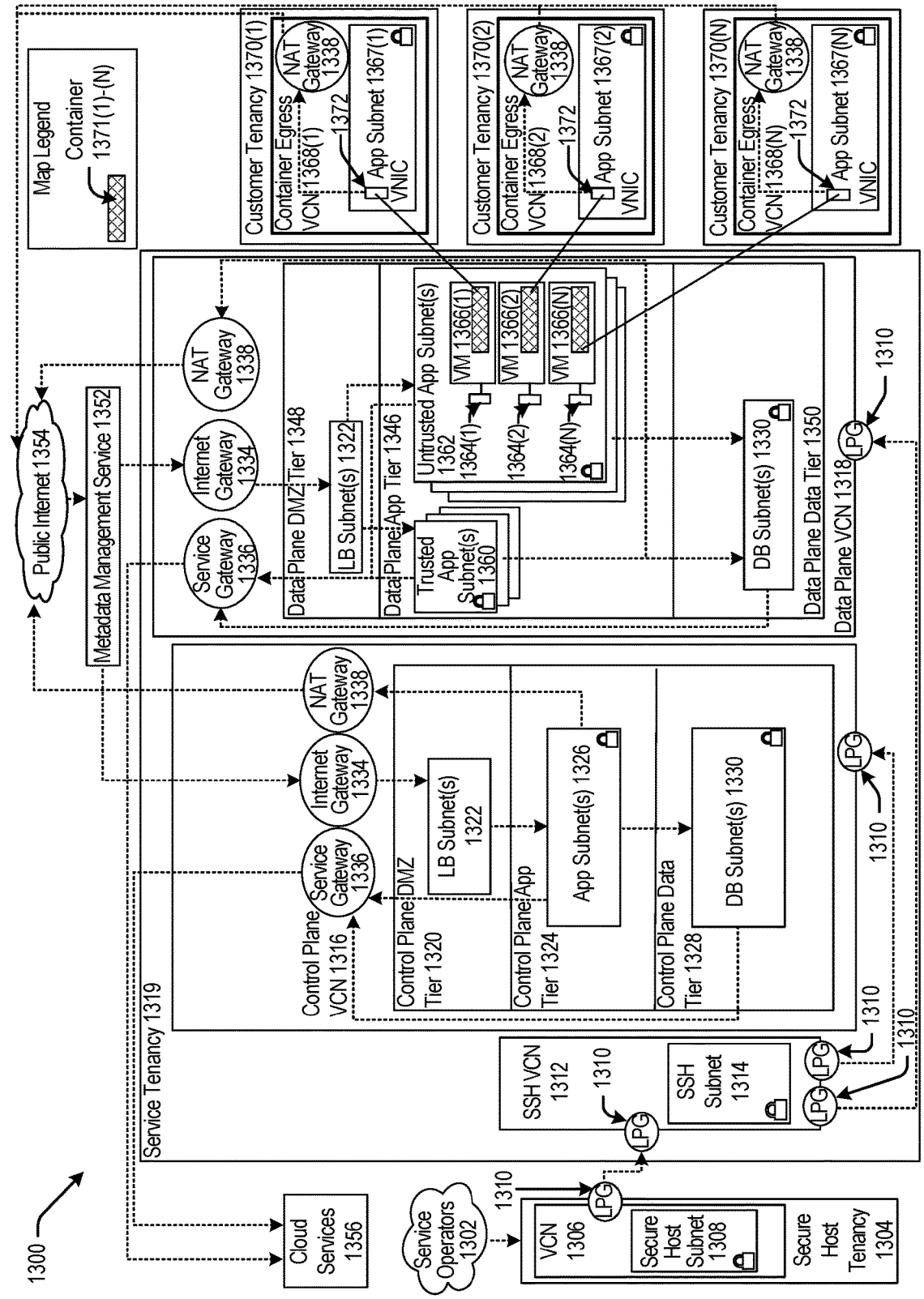
FIG. 13 is a block diagram illustrating another pattern for implementing a cloud infrastructure as a service system, according to at least one embodiment.

FIG. 13 is a block diagram 1300 illustrating another example pattern of an IaaS architecture, according to at least one embodiment. Service operators 1302 (e.g. service operators 1102 of FIG. 11) can be communicatively coupled to a secure host tenancy 1304 (e.g. the secure host tenancy 1104 of FIG. 11) that can include a virtual cloud network (VCN) 1306 (e.g. the VCN 1106 of FIG. 11) and a secure host subnet 1308 (e.g. the secure host subnet 1108 of FIG. 11). The VCN 1306 can include an LPG 1310 (e.g. the LPG 1110 of FIG. 11) that can be communicatively coupled to an SSH VCN 1312 (e.g. the SSH VCN 1112 of FIG. 11) via an LPG 1310 contained in the SSH VCN 1312. The SSH VCN 1312 can include an SSH subnet 1314 (e.g. the SSH subnet 1114 of FIG. 11), and the SSH VCN 1312 can be communicatively coupled to a control plane VCN 1316 (e.g. the control plane VCN 1116 of FIG. 11) via an LPG 1310 contained in the control plane VCN 1316 and to a data plane VCN 1318 (e.g. the data plane 1118 of FIG. 11) via an LPG 1310 contained in the data plane VCN 1318. The control plane VCN 1316 and the data plane VCN 1318 can be contained in a service tenancy 1319 (e.g. the service tenancy 1119 of FIG. 11).

The control plane VCN 1316 can include a control plane DMZ tier 1320 (e.g. the control plane DMZ tier 1120 of FIG. 11) that can include load balancer (LB) subnet(s) 1322 (e.g. LB subnet(s) 1122 of FIG. 11), a control plane app tier 1324 (e.g. the control plane app tier 1124 of FIG. 11) that can include app subnet(s) 1326 (e.g. similar to app subnet(s) 1126 of FIG. 11), a control plane data tier 1328 (e.g. the control plane data tier 1128 of FIG. 11) that can include DB subnet(s) 1330. The LB subnet(s) 1322 contained in the control plane DMZ tier 1320 can be communicatively coupled to the app subnet(s) 1326 contained in the control plane app tier 1324 and to an Internet gateway 1334 (e.g. the Internet gateway 1134 of FIG. 11) that can be contained in the control plane VCN 1316, and the app subnet(s) 1326 can be communicatively coupled to the DB subnet(s) 1330 contained in the control plane data tier 1328 and to a service gateway 1336 (e.g. the service gateway of FIG. 11) and a network address translation (NAT) gateway 1338 (e.g. the NAT gateway 1138 of FIG. 11). The control plane VCN 1316 can include the service gateway 1336 and the NAT gateway 1338.

The data plane VCN 1318 can include a data plane app tier 1346 (e.g. the data plane app tier 1146 of FIG. 11), a data plane DMZ tier 1348 (e.g. the data plane DMZ tier 1148 of FIG. 11), and a data plane data tier 1350 (e.g. the data plane data tier 1150 of FIG. 11). The data plane DMZ tier 1348 can include LB subnet(s) 1322 that can be communicatively coupled to trusted app subnet(s) 1360 and untrusted app subnet(s) 1362 of the data plane app tier 1346 and the Internet gateway 1334 contained in the data plane VCN 1318. The trusted app subnet(s) 1360 can be communicatively coupled to the service gateway 1336 contained in the data plane VCN 1318, the NAT gateway 1338 contained in the data plane VCN 1318, and DB subnet(s) 1330 contained in the data plane data tier 1350. The untrusted app subnet(s) 1362 can be communicatively coupled to the service gateway 1336 contained in the data plane VCN 1318 and DB subnet(s) 1330 contained in the data plane data tier 1350. The data plane data tier 1350 can include DB subnet(s) 1330 that can be communicatively coupled to the service gateway 1336 contained in the data plane VCN 1318.

The untrusted app subnet(s) 1362 can include one or more primary VNICs 1364(1)-(N) that can be communicatively coupled to tenant virtual machines (VMs) 1366(1)-(N). Each tenant VM 1366(1)-(N) can be communicatively coupled to a respective app subnet 1367(1)-(N) that can be contained in respective container egress VCNs 1368(1)-(N) that can be contained in respective customer tenancies 1370(1)-(N). Respective secondary VNICs 1372(1)-(N) can facilitate communication between the untrusted app subnet(s) 1362 contained in the data plane VCN 1318 and the app subnet contained in the container egress VCNs 1368(1)-(N). Each container egress VCNs 1368(1)-(N) can include a NAT gateway 1338 that can be communicatively coupled to public Internet 1354 (e.g. public Internet 1154 of FIG. 11).

The Internet gateway 1334 contained in the control plane VCN 1316 and contained in the data plane VCN 1318 can be communicatively coupled to a metadata management service 1352 (e.g. the metadata management system 1152 of FIG. 11) that can be communicatively coupled to public Internet 1354. Public Internet 1354 can be communicatively coupled to the NAT gateway 1338 contained in the control plane VCN 1316 and contained in the data plane VCN 1318. The service gateway 1336 contained in the control plane VCN 1316 and contained in the data plane VCN 1318 can be communicatively couple to cloud services 1356.

In some embodiments, the data plane VCN 1318 can be integrated with customer tenancies 1370. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1346. Code to run the function may be executed in the VMs 1366(1)-(N), and the code may not be configured to run anywhere else on the data plane VCN 1318. Each VM 1366(1)-(N) may be connected to one customer tenancy 1370. Respective containers 1371(1)-(N) contained in the VMs 1366(1)-(N) may be configured to run the code. In this case, there can be a dual isolation (e.g., the containers 1371(1)-(N) running code, where the containers 1371(1)-(N) may be contained in at least the VM 1366(1)-(N) that are contained in the untrusted app subnet(s) 1362), which may help prevent incorrect or otherwise undesirable code from damaging the network of the IaaS provider or from damaging a network of a different customer. The containers 1371(1)-(N) may be communicatively coupled to the customer tenancy 1370 and may be configured to transmit or receive data from the customer tenancy 1370. The containers 1371(1)-(N) may not be configured to transmit or receive data from any other entity in the data plane VCN 1318. Upon completion of running the code, the IaaS provider may kill or otherwise dispose of the containers 1371(1)-(N).

In some embodiments, the trusted app subnet(s) 1360 may run code that may be owned or operated by the IaaS provider. In this embodiment, the trusted app subnet(s) 1360 may be communicatively coupled to the DB subnet(s) 1330 and be configured to execute CRUD operations in the DB subnet(s) 1330. The untrusted app subnet(s) 1362 may be communicatively coupled to the DB subnet(s) 1330, but in this embodiment, the untrusted app subnet(s) may be configured to execute read operations in the DB subnet(s) 1330. The containers 1371(1)-(N) that can be contained in the VM 1366(1)-(N) of each customer and that may run code from the customer may not be communicatively coupled with the DB subnet(s) 1330.

In other embodiments, the control plane VCN 1316 and the data plane VCN 1318 may not be directly communicatively coupled. In this embodiment, there may be no direct communication between the control plane VCN 1316 and the data plane VCN 1318. However, communication can occur indirectly through at least one method. An LPG 1310 may be established by the IaaS provider that can facilitate communication between the control plane VCN 1316 and the data plane VCN 1318. In another example, the control plane VCN 1316 or the data plane VCN 1318 can make a call to cloud services 1356 via the service gateway 1336. For example, a call to cloud services 1356 from the control plane VCN 1316 can include a request for a service that can communicate with the data plane VCN 1318.

Figure 14:
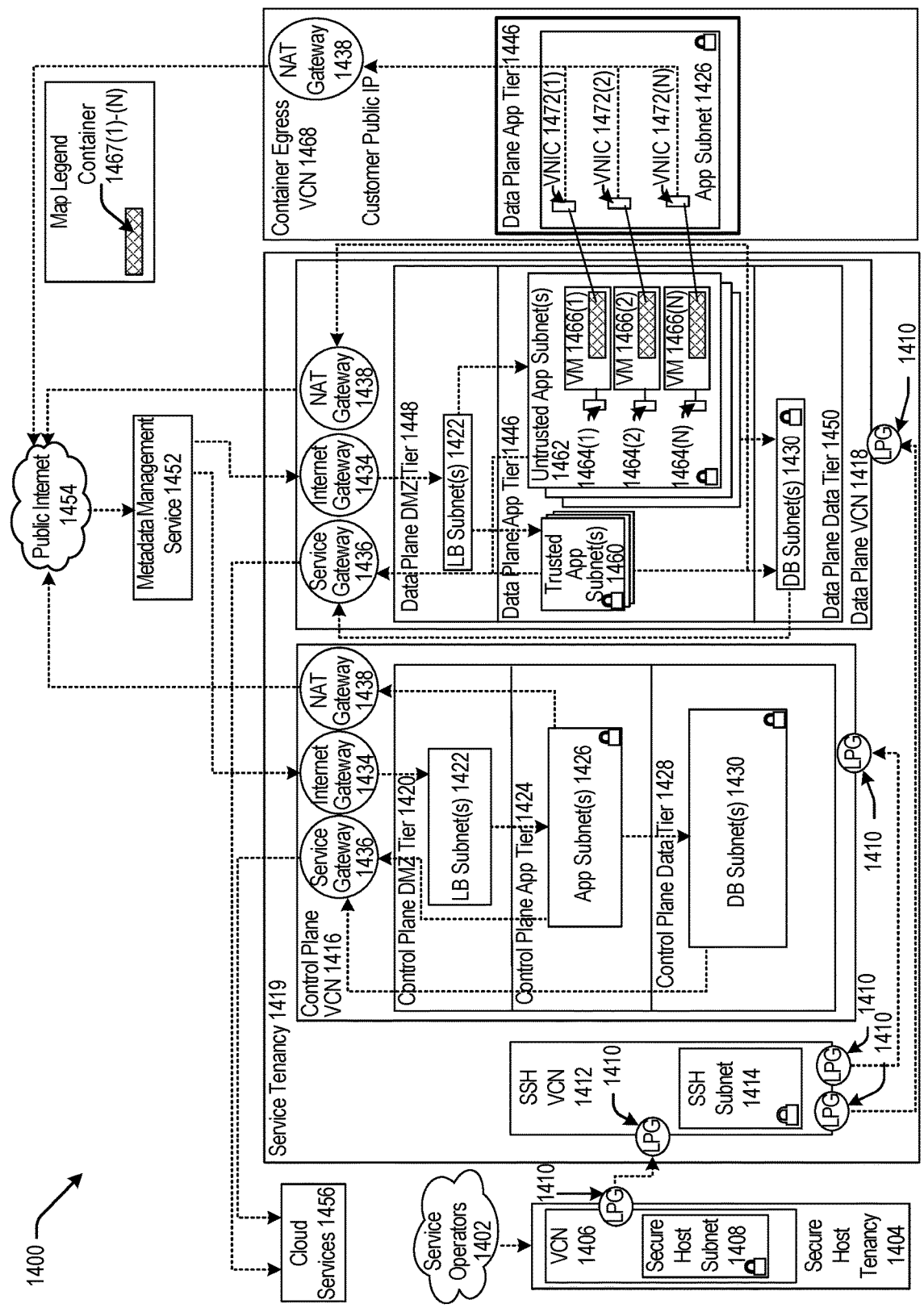
FIG. 14 is a block diagram illustrating another pattern for implementing a cloud infrastructure as a service system, according to at least one embodiment.

FIG. 14 is a block diagram 1400 illustrating another example pattern of an IaaS architecture, according to at least one embodiment. Service operators 1402 (e.g. service operators 1102 of FIG. 11) can be communicatively coupled to a secure host tenancy 1404 (e.g. the secure host tenancy 1104 of FIG. 11) that can include a virtual cloud network (VCN) 1406 (e.g. the VCN 1106 of FIG. 11) and a secure host subnet 1408 (e.g. the secure host subnet 1108 of FIG. 11). The VCN 1406 can include an LPG 1410 (e.g. the LPG 1110 of FIG. 11) that can be communicatively coupled to an SSH VCN 1412 (e.g. the SSH VCN 1112 of FIG. 11) via an LPG 1410 contained in the SSH VCN 1412. The SSH VCN 1412 can include an SSH subnet 1414 (e.g. the SSH subnet 1114 of FIG. 11), and the SSH VCN 1412 can be communicatively coupled to a control plane VCN 1416 (e.g. the control plane VCN 1116 of FIG. 11) via an LPG 1410 contained in the control plane VCN 1416 and to a data plane VCN 1418 (e.g. the data plane 1118 of FIG. 11) via an LPG 1410 contained in the data plane VCN 1418. The control plane VCN 1416 and the data plane VCN 1418 can be contained in a service tenancy 1419 (e.g. the service tenancy 1119 of FIG. 11).

The control plane VCN 1416 can include a control plane DMZ tier 1420 (e.g. the control plane DMZ tier 1120 of FIG. 11) that can include LB subnet(s) 1422 (e.g. LB subnet(s) 1122 of FIG. 11), a control plane app tier 1424 (e.g. the control plane app tier 1124 of FIG. 11) that can include app subnet(s) 1426 (e.g. app subnet(s) 1126 of FIG. 11), a control plane data tier 1428 (e.g. the control plane data tier 1128 of FIG. 11) that can include DB subnet(s) 1430 (e.g. DB subnet(s) 1330 of FIG. 13). The LB subnet(s) 1422 contained in the control plane DMZ tier 1420 can be communicatively coupled to the app subnet(s) 1426 contained in the control plane app tier 1424 and to an Internet gateway 1434 (e.g. the Internet gateway 1134 of FIG. 11) that can be contained in the control plane VCN 1416, and the app subnet(s) 1426 can be communicatively coupled to the DB subnet(s) 1430 contained in the control plane data tier 1428 and to a service gateway 1436 (e.g. the service gateway of FIG. 11) and a network address translation (NAT) gateway 1438 (e.g. the NAT gateway 1138 of FIG. 11). The control plane VCN 1416 can include the service gateway 1436 and the NAT gateway 1438.

The data plane VCN 1418 can include a data plane app tier 1446 (e.g. the data plane app tier 1146 of FIG. 11), a data plane DMZ tier 1448 (e.g. the data plane DMZ tier 1148 of FIG. 11), and a data plane data tier 1450 (e.g. the data plane data tier 1150 of FIG. 11). The data plane DMZ tier 1448 can include LB subnet(s) 1422 that can be communicatively coupled to trusted app subnet(s) 1460 (e.g. trusted app subnet(s) 1360 of FIG. 13) and untrusted app subnet(s) 1462 (e.g. untrusted app subnet(s) 1362 of FIG. 13) of the data plane app tier 1446 and the Internet gateway 1434 contained in the data plane VCN 1418. The trusted app subnet(s) 1460 can be communicatively coupled to the service gateway 1436 contained in the data plane VCN 1418, the NAT gateway 1438 contained in the data plane VCN 1418, and DB subnet(s) 1430 contained in the data plane data tier 1450. The untrusted app subnet(s) 1462 can be communicatively coupled to the service gateway 1436 contained in the data plane VCN 1418 and DB subnet(s) 1430 contained in the data plane data tier 1450. The data plane data tier 1450 can include DB subnet(s) 1430 that can be communicatively coupled to the service gateway 1436 contained in the data plane VCN 1418.

The untrusted app subnet(s) 1462 can include primary VNICs 1464(1)-(N) that can be communicatively coupled to tenant virtual machines (VMs) 1466(1)-(N) residing within the untrusted app subnet(s) 1462. Each tenant VM 1466(1)-(N) can run code in a respective container 1467(1)-(N), and be communicatively coupled to an app subnet 1426 that can be contained in a data plane app tier 1446 that can be contained in a container egress VCN 1468. Respective secondary VNICs 1472(1)-(N) can facilitate communication between the untrusted app subnet(s) 1462 contained in the data plane VCN 1418 and the app subnet contained in the container egress VCN 1468. The container egress VCN can include a NAT gateway 1438 that can be communicatively coupled to public Internet 1454 (e.g. public Internet 1154 of FIG. 11).

The Internet gateway 1434 contained in the control plane VCN 1416 and contained in the data plane VCN 1418 can be communicatively coupled to a metadata management service 1452 (e.g. the metadata management system 1152 of FIG. 11) that can be communicatively coupled to public Internet 1454. Public Internet 1454 can be communicatively coupled to the NAT gateway 1438 contained in the control plane VCN 1416 and contained in the data plane VCN 1418. The service gateway 1436 contained in the control plane VCN 1416 and contained in the data plane VCN 1418 can be communicatively couple to cloud services 1456.

In some examples, the pattern illustrated by the architecture of block diagram 1400 of FIG. 14 may be considered an exception to the pattern illustrated by the architecture of block diagram 1300 of FIG. 13 and may be desirable for a customer of the IaaS provider if the IaaS provider cannot directly communicate with the customer (e.g., a disconnected region). The respective containers 1467(1)-(N) that are contained in the VMs 1466(1)-(N) for each customer can be accessed in real-time by the customer. The containers 1467(1)-(N) may be configured to make calls to respective secondary VNICs 1472(1)-(N) contained in app subnet(s) 1426 of the data plane app tier 1446 that can be contained in the container egress VCN 1468. The secondary VNICs 1472(1)-(N) can transmit the calls to the NAT gateway 1438 that may transmit the calls to public Internet 1454. In this example, the containers 1467(1)-(N) that can be accessed in real-time by the customer can be isolated from the control plane VCN 1416 and can be isolated from other entities contained in the data plane VCN 1418. The containers 1467(1)-(N) may also be isolated from resources from other customers.

In other examples, the customer can use the containers 1467(1)-(N) to call cloud services 1456. In this example, the customer may run code in the containers 1467(1)-(N) that requests a service from cloud services 1456. The containers 1467(1)-(N) can transmit this request to the secondary VNICs 1472(1)-(N) that can transmit the request to the NAT gateway that can transmit the request to public Internet 1454. Public Internet 1454 can transmit the request to LB subnet(s) 1422 contained in the control plane VCN 1416 via the Internet gateway 1434. In response to determining the request is valid, the LB subnet(s) can transmit the request to app subnet(s) 1426 that can transmit the request to cloud services 1456 via the service gateway 1436.

It should be appreciated that IaaS architectures 1100, 1200, 1300, 1400 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 15:
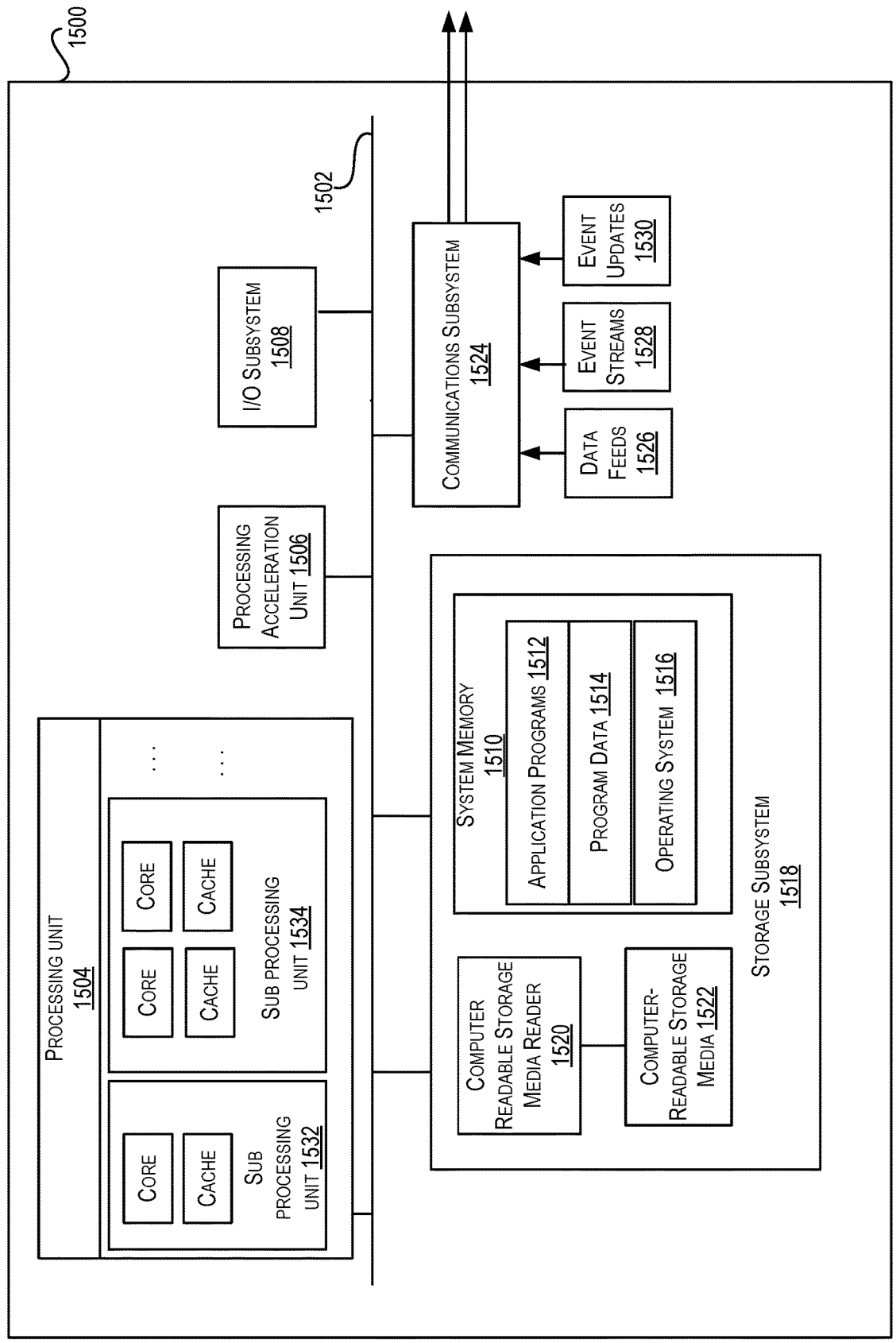
FIG. 15 is a block diagram illustrating an example computer system, according to at least one embodiment.

FIG. 15 illustrates an example computer system 1500, in which various embodiments of the present disclosure may be implemented. The system 1500 may be used to implement any of the computer systems described above. As shown in the figure, computer system 1500 includes a processing unit 1504 that communicates with a number of peripheral subsystems via a bus subsystem 1502. These peripheral subsystems may include a processing acceleration unit 1506, an I/O subsystem 1508, a storage subsystem 1518 and a communications subsystem 1524. Storage subsystem 1518 includes tangible computer-readable storage media 1522 and a system memory 1510.

Bus subsystem 1502 provides a mechanism for letting the various components and subsystems of computer system 1500 communicate with each other as intended. Although bus subsystem 1502 is shown schematically as a single bus, alternative embodiments of the bus subsystem may utilize multiple buses. Bus subsystem 1502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1504, which can be implemented as one or more integrated circuits (e.g., a conventional microprocessor or microcontroller), controls the operation of computer system 1500. One or more processors may be included in processing unit 1504. These processors may include single core or multicore processors. In certain embodiments, processing unit 1504 may be implemented as one or more independent processing units 1532 and/or 1534 with single or multicore processors included in each processing unit. In other embodiments, processing unit 1504 may also be implemented as a quad-core processing unit formed by integrating two dual-core processors into a single chip.

In various embodiments, processing unit 1504 can execute a variety of programs in response to program code and can maintain multiple concurrently executing programs or processes. At any given time, some or all of the program code to be executed can be resident in processor(s) 1504 and/or in storage subsystem 1518. Through suitable programming, processor(s) 1504 can provide various functionalities described above. Computer system 1500 may additionally include a processing acceleration unit 1506, which can include a digital signal processor (DSP), a special-purpose processor, and/or the like.

I/O subsystem 1508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1500 may comprise a storage subsystem 1518 that comprises software elements, shown as being currently located within a system memory 1510. System memory 1510 may store program instructions that are loadable and executable on processing unit 1504, as well as data generated during the execution of these programs.

Depending on the configuration and type of computer system 1500, system memory 1510 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1504. In some implementations, system memory 1510 may include multiple different types of memory, such as static random access memory (SRAM) or dynamic random access memory (DRAM). In some implementations, a basic input/output system (BIOS), containing the basic routines that help to transfer information between elements within computer system 1500, such as during start-up, may typically be stored in the ROM. By way of example, and not limitation, system memory 1510 also illustrates application programs 1512, which may include client applications, Web browsers, mid-tier applications, relational database management systems (RDBMS), etc., program data 1514, and an operating system 1516. By way of example, operating system 1516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 15 OS, and Palm® OS operating systems.

Storage subsystem 1518 may also provide a tangible computer-readable storage medium for storing the basic programming and data constructs that provide the functionality of some embodiments. Software (programs, code modules, instructions) that when executed by a processor provide the functionality described above may be stored in storage subsystem 1518. These software modules or instructions may be executed by processing unit 1504. Storage subsystem 1518 may also provide a repository for storing data used in accordance with the present disclosure.

Storage subsystem 1500 may also include a computer-readable storage media reader 1520 that can further be connected to computer-readable storage media 1522. Together and, optionally, in combination with system memory 1510, computer-readable storage media 1522 may comprehensively represent remote, local, fixed, and/or removable storage devices plus storage media for temporarily and/or more permanently containing, storing, transmitting, and retrieving computer-readable information.

Computer-readable storage media 1522 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1500.

By way of example, computer-readable storage media 1522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1522 may include, but is not limited to, Zip® drives, flash memory cards, universal serial bus (USB) flash drives, secure digital (SD) cards, DVD disks, digital video tape, and the like. Computer-readable storage media 1522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1500.

Communications subsystem 1524 provides an interface to other computer systems and networks. Communications subsystem 1524 serves as an interface for receiving data from and transmitting data to other systems from computer system 1500. For example, communications subsystem 1524 may enable computer system 1500 to connect to one or more devices via the Internet. In some embodiments communications subsystem 1524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1524 can provide wired network connectivity (e.g., Ethernet) in addition to or instead of a wireless interface.

In some embodiments, communications subsystem 1524 may also receive input communication in the form of structured and/or unstructured data feeds 1526, event streams 1528, event updates 1530, and the like on behalf of one or more users who may use computer system 1500.

By way of example, communications subsystem 1524 may be configured to receive data feeds 1526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1524 may also be configured to receive data in the form of continuous data streams, which may include event streams 1528 of real-time events and/or event updates 1530, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1524 may also be configured to output the structured and/or unstructured data feeds 1526, event streams 1528, event updates 1530, and the like to one or more databases that may be in communication with one or more streaming data source computers coupled to computer system 1500.

Computer system 1500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1500 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
    providing, by a computer system, a first resource through a cloud service for use within a logical container associated with a client of the computer system;
    determining, by the computer system, that the first resource will be configured to operate for a limited duration in the logical container; and
    based upon determining that the first resource will be configured to operate for a limited duration in the logical container, generating, by the computer system, a digital token for the first resource, wherein the digital token has a validity period and permits the first resource to access a second resource in the logical container while the digital token remains valid.

2. The method of claim 1, wherein the first resource is software code executed in its own container under a Functions as a Service model.

3. The method of claim 2, wherein the first resource is executed one time, periodically on a scheduled basis, or in response to one or more conditions being satisfied with respect to a third resource in the logical container.

4. The method of claim 1, further comprising:
    assigning, by the computer system, an identifier to a third resource on which the first resource operates, wherein the digital token permits the first resource to access the second resource without identifying itself based upon the identifier assigned to the third resource.

5. The method of claim 4, wherein the third resource is a compute instance.

6. The method of claim 1, further comprising:
    accessing, by the first resource, the second resource, wherein accessing the second resource includes communicating a request to the second resource, the request including the digital token and signed using a credential associated with the first resource.

7. The method of claim 6, wherein the credential associated with the first resource is a private key kept secret by the first resource, and wherein the private key expires when the first resource finishes operating.

8. A computer system comprising:
    one or more processors; and
    a memory in communication with the one or more processors, the memory storing instructions that, when executed by the one or more processors, cause the one or more processors to:
    provide a first resource through a cloud service for use within a logical container associated with a client of the computer system;
    determine that the first resource will be configured to operate for a limited duration in the logical container; and
    based upon determining that the first resource will be configured to operate for a limited duration in the logical container, generate a digital token for the first resource, wherein the digital token has a validity period and permits the first resource to access a second resource in the logical container while the digital token remains valid.

9. The computer system of claim 8, wherein the first resource is software code executed in its own container under a Functions as a Service model.

10. The computer system of claim 9, wherein the first resource is executed one time, periodically on a scheduled basis, or in response to one or more conditions being satisfied with respect to a third resource in the logical container.

11. The computer system of claim 8, wherein the instructions further cause the one or more processors to:
assign an identifier to a third resource on which the first resource operates, wherein the digital token permits the first resource to access the second resource without identifying itself based upon the identifier assigned to the third resource.

12. The computer system of claim 11, wherein the third resource is a compute instance.

13. The computer system of claim 8, wherein the first resource is configured to access the second resource by communicating a request to the second resource, the request including the digital token and signed using a credential associated with the first resource.

14. The computer system of claim 13, wherein the credential associated with the first resource is a private key kept secret by the first resource, and wherein the private key expires when the first resource finishes operating.

15. A non-transitory computer-readable storage medium storing instructions that, when executed by one or more processors of a computer system, cause the one or more processors to perform steps comprising:
providing a first resource through a cloud service for use within a logical container associated with a client of the computer system;
determining that the first resource will be configured to operate for a limited duration in the logical container; and
based upon determining that the first resource will be configured to operate for a limited duration in the logical container, generating a digital token for the first resource, wherein the digital token has a validity period and permits the first resource to access a second resource in the logical container while the digital token remains valid.

16. The non-transitory computer-readable storage medium of claim 15, wherein the first resource is software code executed in its own container under a Functions as a Service model.

17. The non-transitory computer-readable storage medium of claim 16, wherein the first resource is executed one time, periodically on a scheduled basis, or in response to one or more conditions being satisfied with respect to a third resource in the logical container.

18. The non-transitory computer-readable storage medium of claim 15, wherein the steps further comprises:
assigning an identifier to a third resource on which the first resource operates, wherein the digital token permits the first resource to access the second resource without identifying itself based upon the identifier assigned to the third resource.

19. The non-transitory computer-readable storage medium of claim 15, wherein the first resource is configured to access the second resource by communicating a request to the second resource, the request including the digital token and signed using a credential associated with the first resource.

20. The non-transitory computer-readable storage medium of claim 19, wherein the credential associated with the first resource is a private key kept secret by the first resource, and wherein the private key expires when the first resource finishes operating.

* * * * *